US008444055B2

(12) United States Patent
Makida et al.

(10) Patent No.: US 8,444,055 B2
(45) Date of Patent: May 21, 2013

(54) DETECTION DEVICE AND PROCESSING SYSTEM

(75) Inventors: Seigo Makida, Kanagawa (JP); Shoji Yamaguchi, Kanagawa (JP); Katsumi Sakamaki, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 32 days.

(21) Appl. No.: 13/182,110

(22) Filed: Jul. 13, 2011

(65) Prior Publication Data

US 2012/0199646 A1 Aug. 9, 2012

(30) Foreign Application Priority Data

Feb. 9, 2011 (JP) ................................ 2011-026397

(51) Int. Cl.
*G06K 7/08* (2006.01)

(52) U.S. Cl.
USPC .......................................................... 235/449

(58) Field of Classification Search
USPC ................................................. 235/449, 450
See application file for complete search history.

(56) References Cited

U.S. PATENT DOCUMENTS 4,079,360 A * 3/1978 Ookubo et al. ............... 365/158
5,541,577 A 7/1996 Cooper et al.
6,169,481 B1 1/2001 Goldberg et al.
6,289,141 B1 * 9/2001 Roseman ...................... 382/320
6,598,793 B1 * 7/2003 Fisher et al. .................. 235/449
2006/0038013 A1 * 2/2006 Yamaguchi et al. .......... 235/449
2009/0026261 A1 1/2009 Inoue et al.
2010/0201355 A1 8/2010 Yamaguchi et al.

FOREIGN PATENT DOCUMENTS

JP A-2009-151687 7/2009

OTHER PUBLICATIONS

Apr. 10, 2012 Search Report issued in European Patent Application No. 11175001.4.

* cited by examiner

*Primary Examiner* — Jamara Franklin
(74) *Attorney, Agent, or Firm* — Oliff & Berridge, PLC

(57) ABSTRACT

When a user who has a magnetic substance attached paper enters a gate which generates a magnetic field, steep magnetization reversal is produced in the magnetic substance by the magnetic field. As a result, pulse current flows into a detection coil provided in the gate, and a generated waveform signal indicating a characteristic transient response is output to a terminal device. The terminal device calculates correlation coefficients of this waveform and a plurality of stored reference waveforms, additionally calculates an average of the calculated correlation coefficients, and determines whether or not the average is equal to or more than a threshold. When the average is equal to or more than the threshold, the terminal device instructs an imaging device to image a user. When the average is below the threshold, the imaging device is not allowed to image the user.

12 Claims, 23 Drawing Sheets

DETECTION DEVICE AND PROCESSING SYSTEM

CROSS-REFERENCE TO RELATED APPLICATION

This application is based on and claims priority under 35 USC 119 from Japanese Patent Application No. 2011-026397 filed on Feb. 9, 2011.

BACKGROUND

1. Technical Field

The present invention relates to a detecting device and a processing system.

2. Related Art

In recent years, security systems have been developed to prevent leakage of secret information.

SUMMARY

[1] According to an aspect of the invention, a detection device includes a magnetic field generating unit, a sensing unit, an amplifying unit, a first calculating unit, a second calculating unit, a third calculating unit and a detecting unit. The magnetic field generating unit generates a magnetic field. The sensing unit detects a change in the magnetic field by a magnetic substance excited by the generated magnetic field and outputs a signal in response to the detected change in the magnetic field. The amplifying unit amplifies the signal output from the sensing unit so as to outputs a waveform signal indicating a transient response waveform. The first calculating unit calculates and outputs a first correlation coefficient between the transient response waveform and a first reference waveform indicating a transient response waveform which is preliminarily stored. The second calculating unit calculates and outputs a second correlation coefficient between the transient response waveform and a second reference waveform indicating a transient response waveform which is preliminarily stored. The third calculating unit calculates a value based on the first correlation coefficient and the second correlation coefficient. The detecting unit outputs a detection signal indicating that the magnetic substance is detected when the value calculated by the third calculating unit satisfies a predetermined condition.

BRIEF DESCRIPTION OF THE DRAWINGS

Exemplary embodiment of the invention will be described in detail based on the following figures, wherein.

DETAILED DESCRIPTION

Hereinafter, embodiments of the invention will be described with reference to the drawings. In the following description, a processing system in the invention will be illustrated with a security system intended to monitor taking-out of a secret document; however, the processing system may have any purpose.

[A. Configuration]

Figure 1:
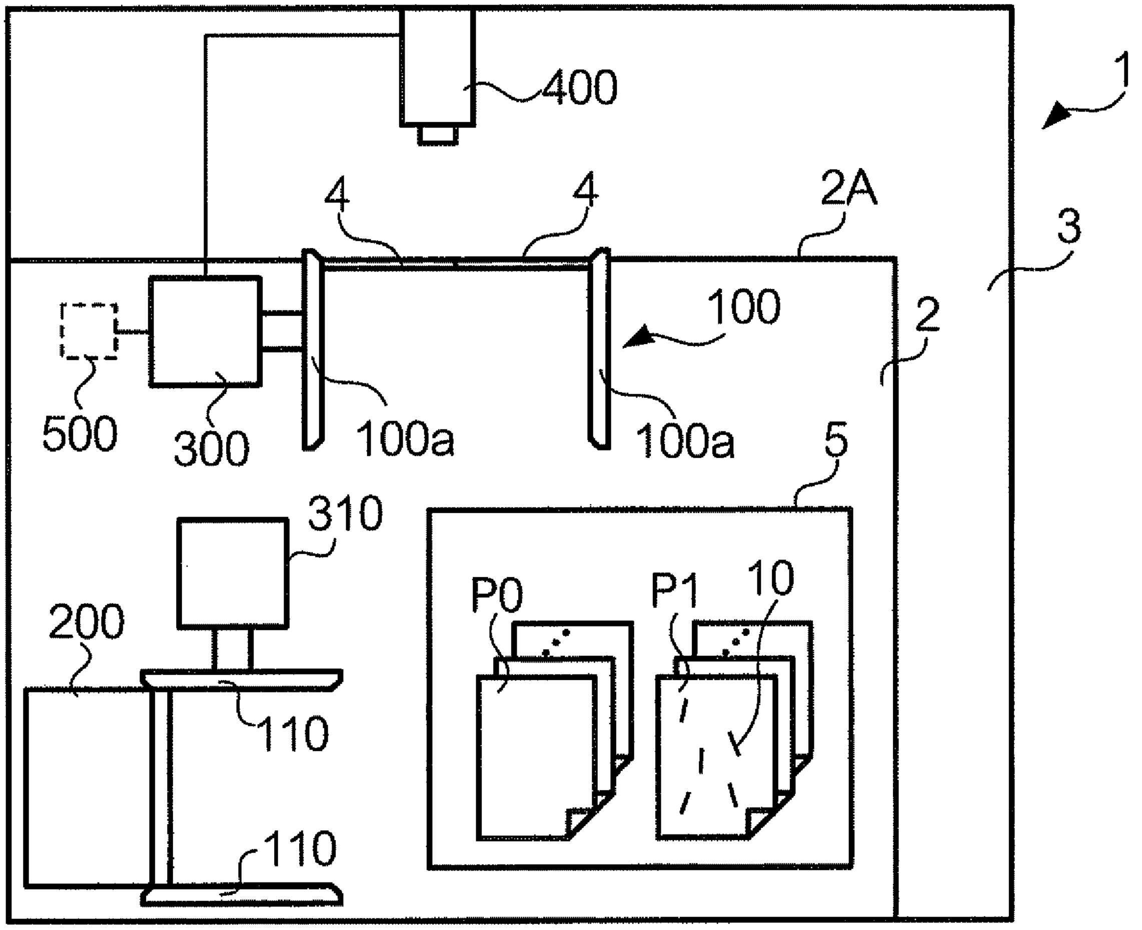
FIG. 1 is a configuration view of a security system according to an embodiment of the invention.

FIG. 1 is a plan view of a room where a security system 1 according to an embodiment of the invention is installed. A storage chamber 2 shown in FIG. 1 stores documents and so on and is surrounded by a wall 2A. An outer side of the wall 2A of the storage chamber 2 corresponds to a hallway 3. A portion of the wall 2A of the storage chamber 2 is provided with a pair of doors 4 which may be freely opened/closed and access to the hallway 3 which is an external space may be made via the doors 4. The doors 4 are connected to the wall 2A by hinges in an openable/closable manner and may be opened to the hallway 3.

Near the hinge connection of the doors 4 is provided a gate 100 including two opposing panels 100_a_-1 and 100_a_-2 (hereinafter being represented by a panel 100_a_ when they are not distinguished) extending toward the inside of the storage chamber 2 and a user who gets out of the storage chamber 2 has to pass through this panel 100_a_.

Figure 2:
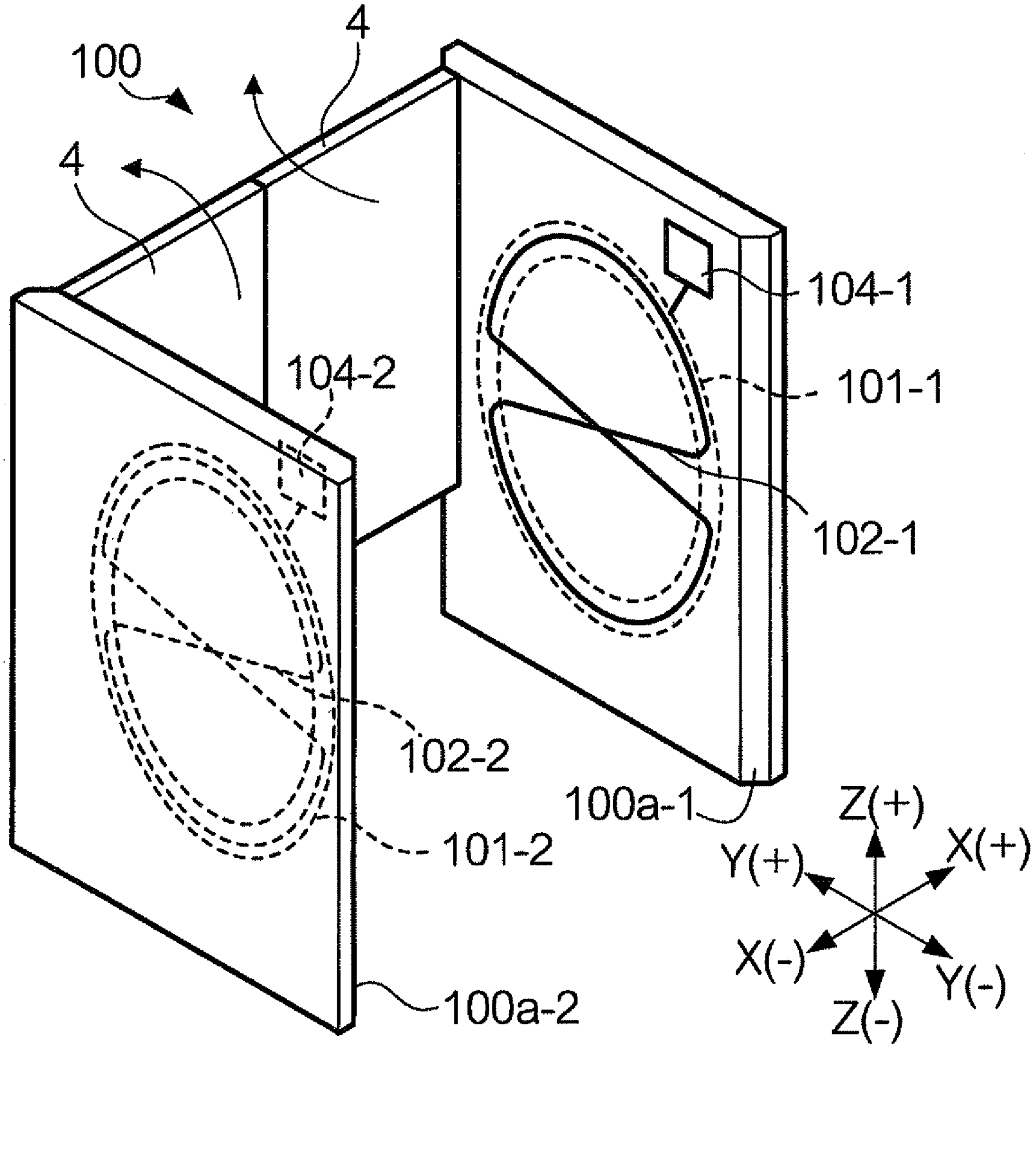
FIG. 2 is a configuration view of a gate.

FIG. 2 is a configuration view of the gate 100. As shown in FIG. 2, the panel 100_a_-1 and the panel 100_a_-2 of the gate 100 contain an excitation coil 101-1 and an excitation coil 101-2 (hereinafter being represented by an excitation coil 101 when they are not distinguished), respectively, and an AC power supply 103 (not shown in FIG. 2) is connected to the excitation coil 101. The AC power supply 103 flows an alternating current of, for example, 1 kHz into the excitation coil 101. This allows an alternating magnetic field to be produced around the excitation coil 101.

In addition, in this embodiment, since the AC power supply 103 flows the alternating current into the excitation coil 101 at all times, the alternating magnetic field is always produced in a space defined by the panel 100_a_ of the gate 100.

The excitation coil 101 is one example of "magnetic generating unit" of the present invention.

A detection coil 102-1 and a detection coil 102-2 (hereinafter being represented by a detection coil 102 when they are not distinguished) are figure of 8-shaped coils which overlap the excitation coil 101 and through which a current flows according to a change in a penetrating magnetic line of force. A detecting unit 104-1 and a detecting unit 104-2 (hereinafter being represented by a detecting unit 104 when they are not distinguished) are connected to the detection coil 102-1 and the detection coil 102-2, respectively, and output signals based on an amount of current flowing through the detection coil 102.

In addition, the current flowing through the detection coil 102 increases as a magnetic flux penetrating through the detection coil 102 changes suddenly per unit of time. Details of the detecting unit 104 will be described later.

The detection coil 102 is one example of "a sensing unit" of the present invention.

Figure 3:
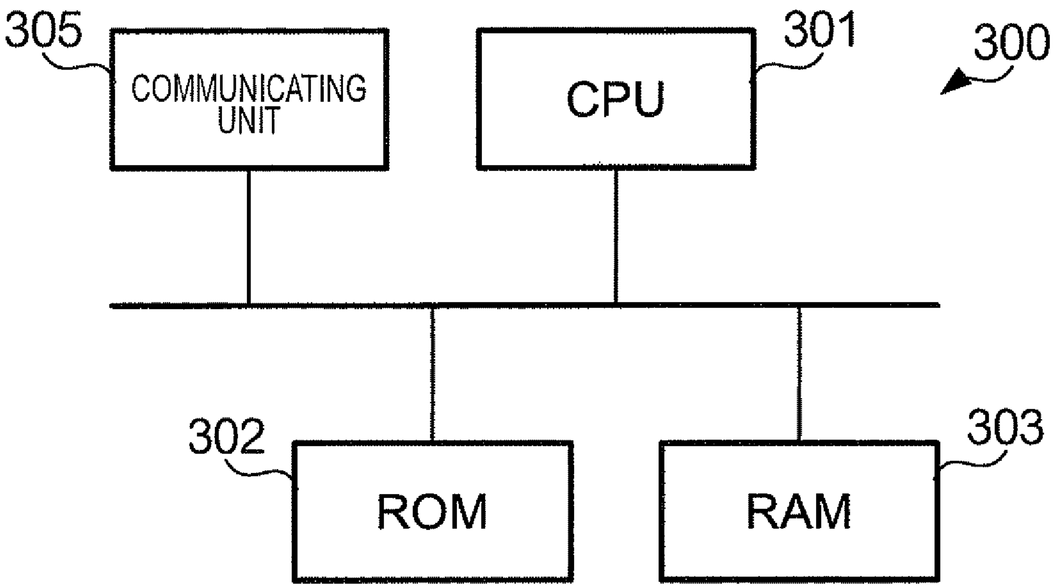
FIG. 3 is a configuration view of a terminal device.

Returning to FIG. 1, a terminal device 300 controls an imaging device 400 based on a signal supplied from the detecting unit 104 of the gate 100. FIG. 3 is a configuration view of the terminal device 300. As shown in FIG. 3, the terminal device 300 includes a central processing unit (CPU) 301, a read only memory (ROM) 302 and a random access memory (RAM) 303 and the CPU 301 reads out various control programs stored in the ROM 302 and executes the various control programs using the RAM 303 as a work area. The CPU 301 is one example of "first calculating unit," "second calculating unit," "third calculating unit" and "detecting unit."

A communicating unit 305 is provided in a connection to a communication line and communicates with devices connected via the communication line.

Figure 4:
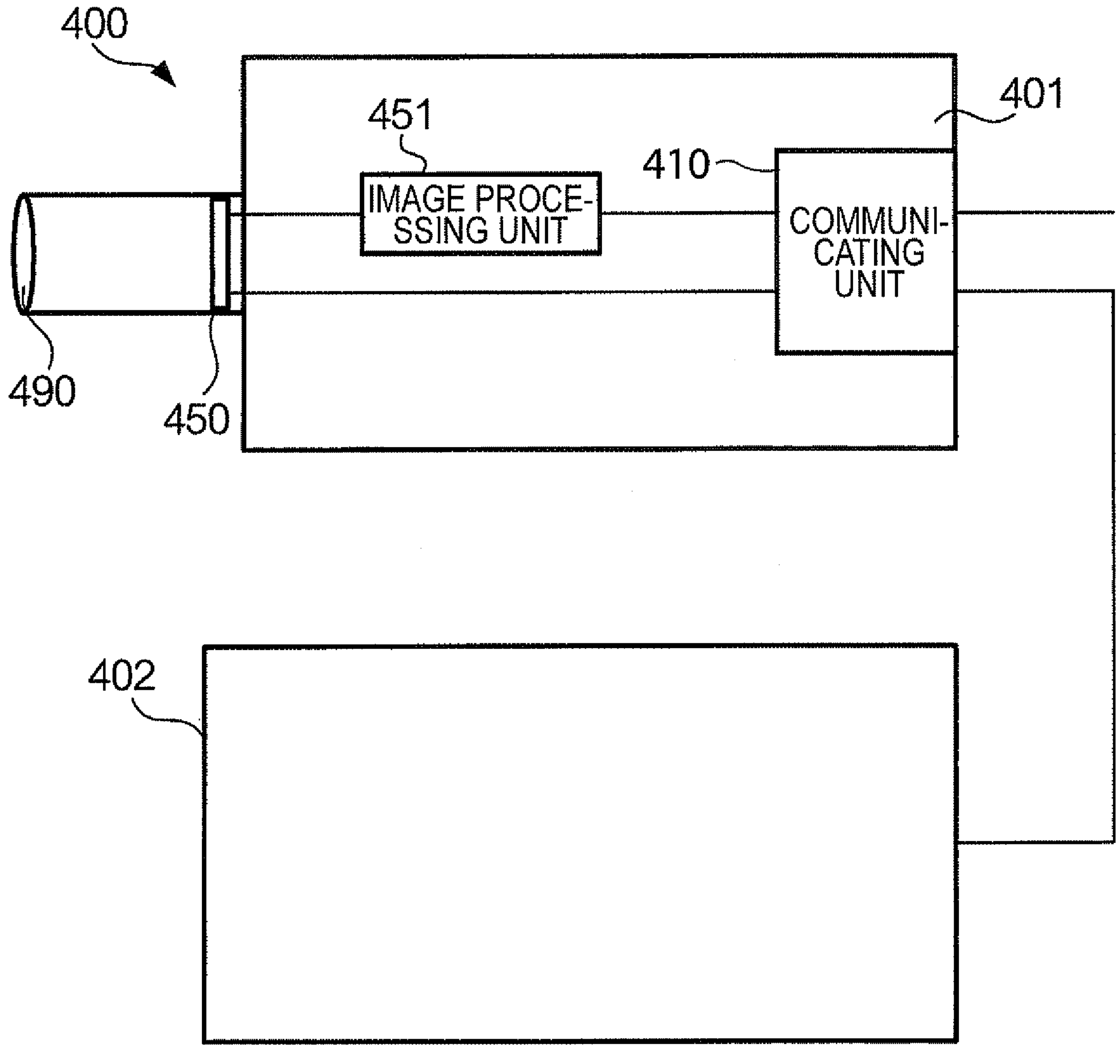
FIG. 4 is a configuration view of an imaging device.

As shown in FIG. 1, the above-mentioned imaging device 400 is provided in a wall of the hallway 3 facing a user who opens the door 4 to get out of the storage chamber 2 and is fixed in a direction in which the door 4 can be wholly imaged. FIG. 4 is a configuration view of the imaging device 400. The imaging device 400 includes a body 401 which performs an imaging operation and a recorder 402 which stores image data obtained by the imaging operation. The body 401 and the recorder 402 are connected by a cable or the like and exchange data with each other.

A communicating unit 410 is contained in the body 401 and is connected to a communication line. A fixed lens 490 is provided in an end of the body 401 in an imaging direction and condenses light emitted from an image in the imaging direction onto a CCD sensor 450 to form an image. The CCD sensor 450 supplies an analog signal corresponding to the formed image to an image processing unit 451. The image processing unit 451 converts the supplied analog signal into digital image data which is then sent to the recorder 402. The recorder 402 stores the image data supplied from the image processing unit 451.

Next, returning to FIG. 1, a shelf 5 shown in FIG. 1 is provided inside the storage chamber 2 and contains various kinds of documents. The documents contained in the shelf 5 may include typical papers P0 and magnetic substance attached papers P1. The magnetic substance attached papers P1 are accommodated in the shelf 5 in the form of a file, for example. The papers P0 and the magnetic substance attached papers P1 are printed matter and are provided as materials. A user in the storage chamber 2 may freely carry any magnetic substance papers P1 or other papers P0 taken out of the file.

Figure 5:
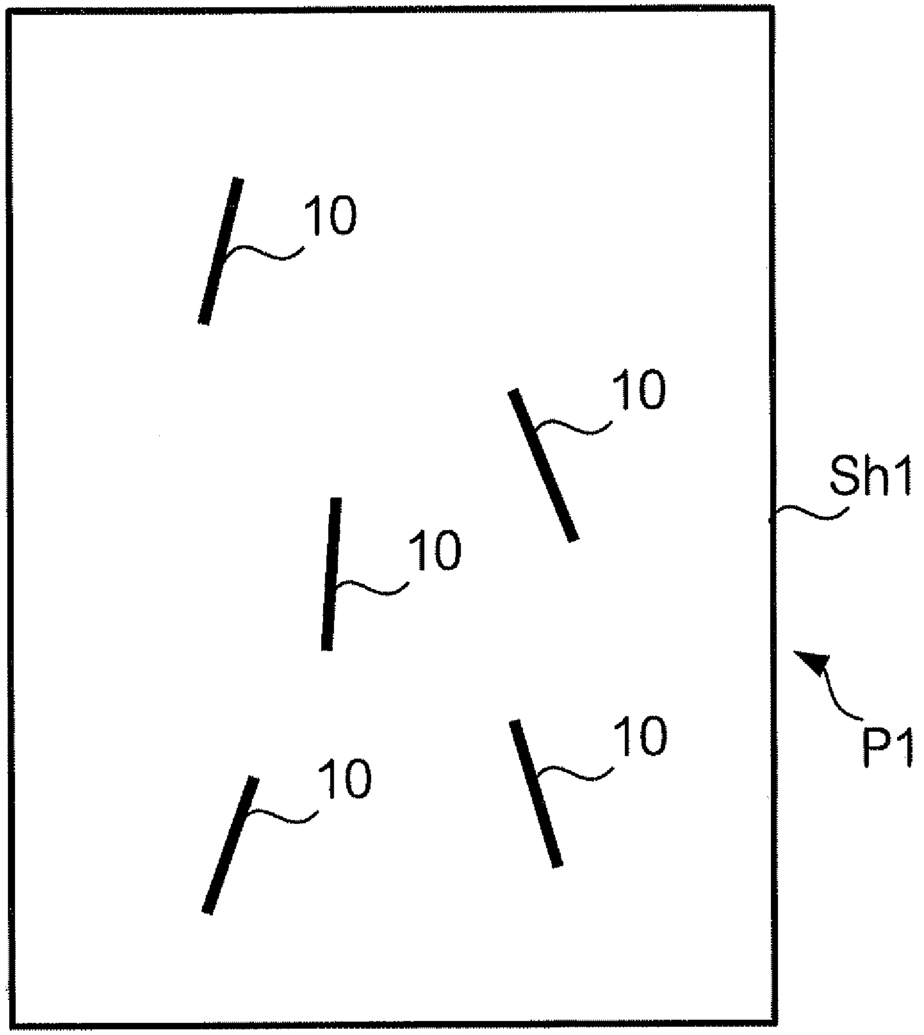
FIG. 5 is a plan view of a magnetic substance attached paper including a base material and a magnetic substance wire embedded in the base material.

Now, configuration of a magnetic substance paper P1 will be described. A magnetic substance paper P1 includes a magnetic substance wire 10 inserted in (or carried on) an ordinary paper. FIG. 5 is a plan view of a magnetic substance attached paper P1 including a base material Sh1 and a magnetic substance wire 10 embedded in the base material. The base material Sh1 corresponds to ordinary paper and is mainly made from pulp fibers. The magnetic substance wire 10 is for example a fiber-like magnetic substance and has a property to cause a large Barkhausen effect. The thickness of the magnetic substance wire 10 is equal to or less than that of the magnetic substance attached paper P1. In this example, about several to 50 magnetic substance wires 10 are carried on the entire surface of the base material Sh1. Although the magnetic substance wires 10 are indicated by solid lines in FIG. 1, in reality, positions and shapes of the magnetic substance wires 10 can be visible to some extent, for example when the magnetic substance attached paper P1 is irradiated with light, while, in other cases, they are hard to see. In addition, since images such as characters, figures and the like representing contents of a document are formed on a surface of the magnetic substance attached paper P1, it is even more difficult to see the positions and shapes of the magnetic substance wires 10.

Figure 6B:
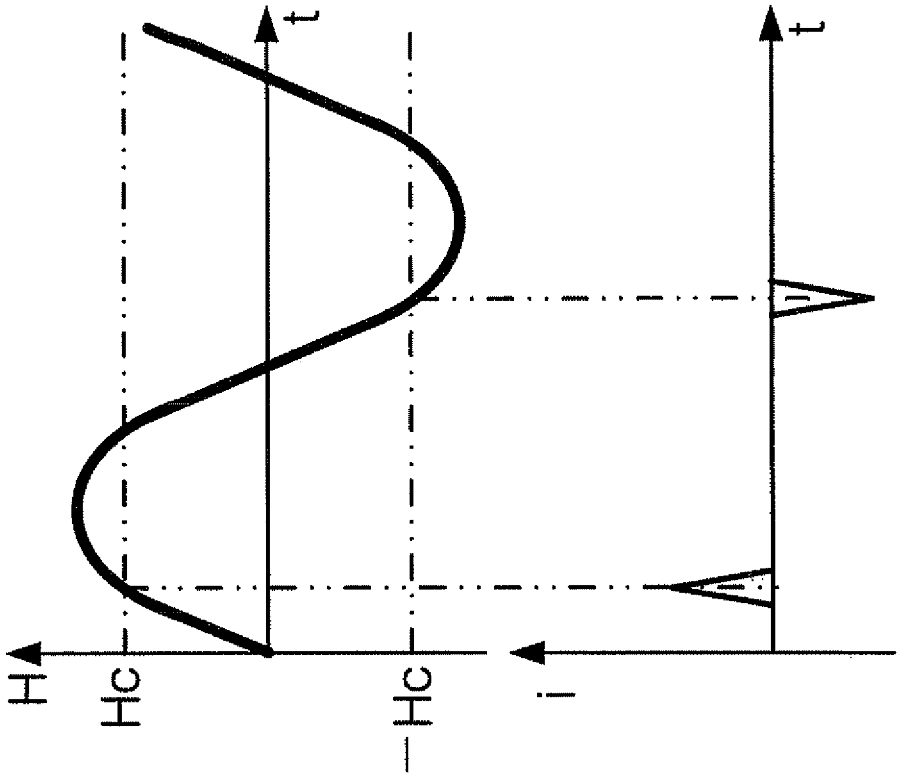
FIGS. 6A and 6B are views used to explain a large Barkhausen effect.
Figure 6A:
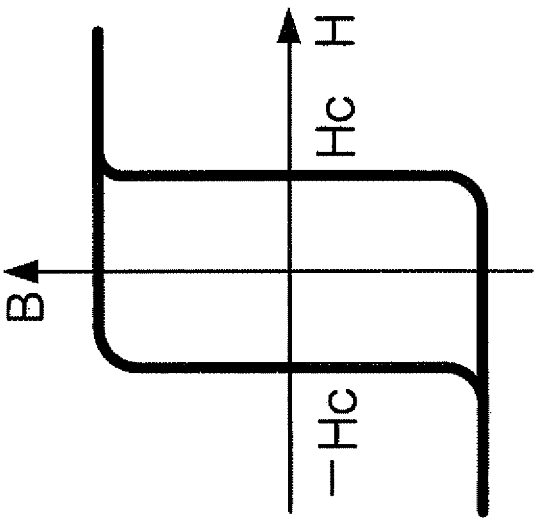

Here, a large Barkhausen effect will be described in brief. FIGS. 6A and 6B are views used to explain a large Barkhausen effect. A large Barkhausen effect refers to an effect of steep magnetization reversal produced when an alternating magnetic field is applied to an amorphous magnetic substance made of a material having a B-H characteristic shown in FIG. 6A, that is, substantially a rectangular hysteresis loop, and a relatively small coercive force (Hc), for example, Co—Fe—Ni—B—Si. This effect allows a pulse-like current to flow into a detection coil disposed near an excited magnetic substance in magnetization reversal when the magnetic substance is placed under an alternating magnetic field generated by flowing an alternating current into an excitation coil. For example, when an alternating magnetic field which has a waveform as shown in the upper portion of FIG. 6B is generated by an excitation coil, a pulse current which has a waveform as shown in the lower portion of FIG. 6B flows into a detection coil. However, the current flowing into the detection coil may include an alternating current induced by the alternating magnetic field and the pulse current is detected with the alternating current overlaying the pulse current.

Next, detailed configuration of the detecting unit 104 will be described.

Figure 7:
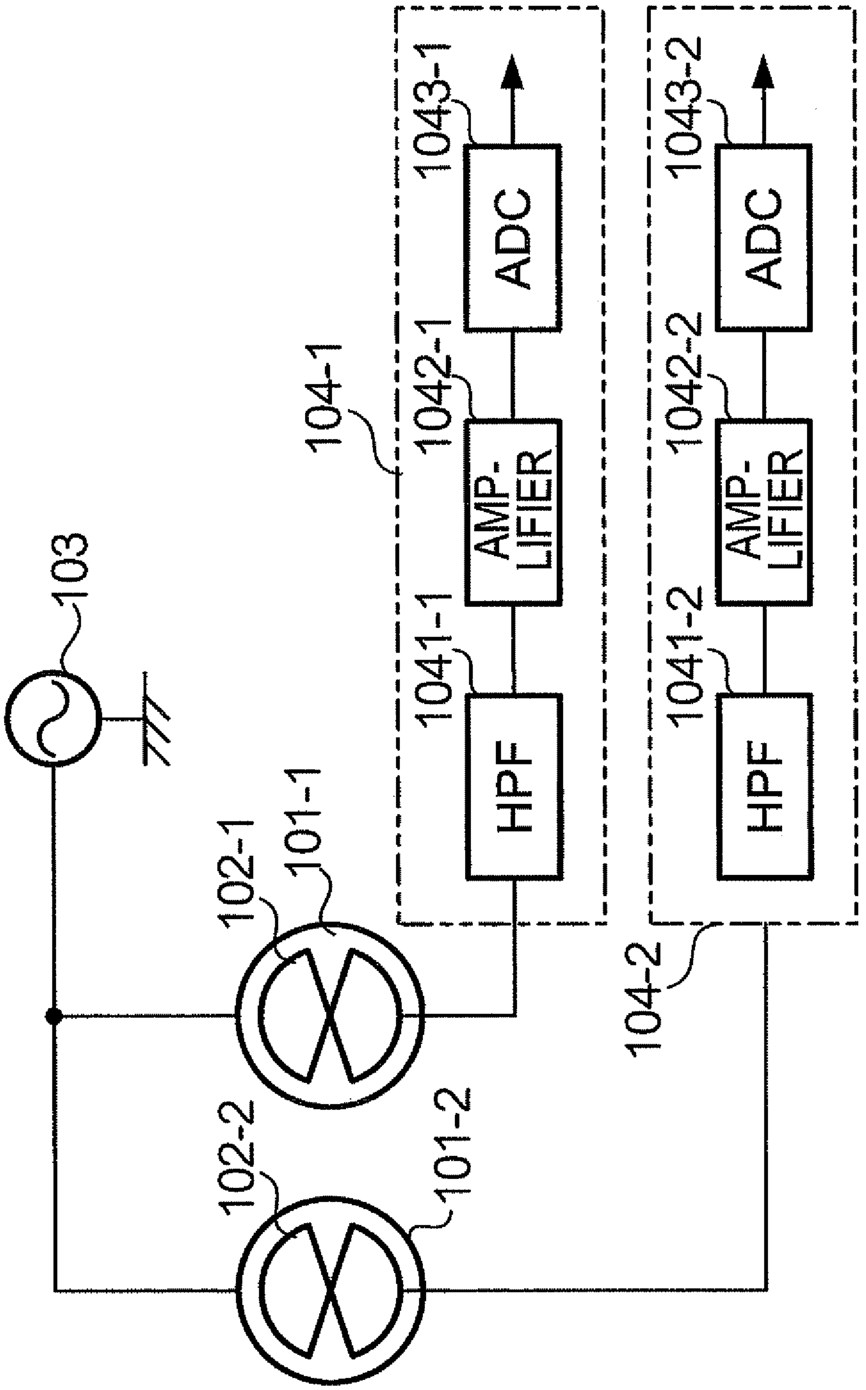
FIG. 7 is a functional configuration view of a detecting unit.

FIG. 7 is a functional configuration view of the detecting unit 104. An output signal of the detection coil 102-1 is output via a high-pass filter (HPF) 1041-1, an amplifier 1042-1 and an analog-to-digital converter (ADC) 1043-1 of the detecting unit 104-1 shown by a broken line in the lower portion of FIG. 7 and an output signal of the detection coil 102-2 is output via a HPF 1041-2, an amplifier 1042-2 and an ADC 1043-2 of the detecting unit 104-2 shown by a broken line in the lower portion of FIG. 7. In addition, as described above, a waveform signal output by each of the detection coil 102-1 and the detection coil 102-2 is a waveform signal of an overlay of a current induced by the alternating magnetic field having the waveform as shown in the upper portion of FIG. 6B and the pulse current having the waveform as shown in the lower portion of FIG. 6B.

The HPF 1041-1 and the HPF 1041-2 (hereinafter being represented by a HPF 1041 when they are not distinguished), which are high pass filters, remove current components of, e.g., 1 kHz, induced by an alternating magnetic field from the output of the detection coil 102-1 and the output of the detection coil 102-2, respectively, while passing pulse currents produced by a large Barkhausen effect caused by the magnetic substance. Accordingly, the pulse currents passing the HPF 1041-1 and the HPF 1041-2 have waveforms as shown in the lower portion of FIG. 6B.

The amplifier 1042-1 and the amplifier 1042-2 (hereinafter being represented by an amplifier 1042 when they are not distinguished) amplify the pulse currents passed through the HPF 1041-1 and the HPF 1041-2 and output amplified signals, respectively. At this point, a characteristic of the amplifier 1042 is adjusted to generate a so-called ringing for a pulse current input. A ringing is a kind of transient response and refers to a waveform produced when a steeply varying signal such as a square wave, a pulse wave or the like passes through a network or the like.

The amplifier 1041 is one example of "amplifying unit" of the present invention.

Figure 8:
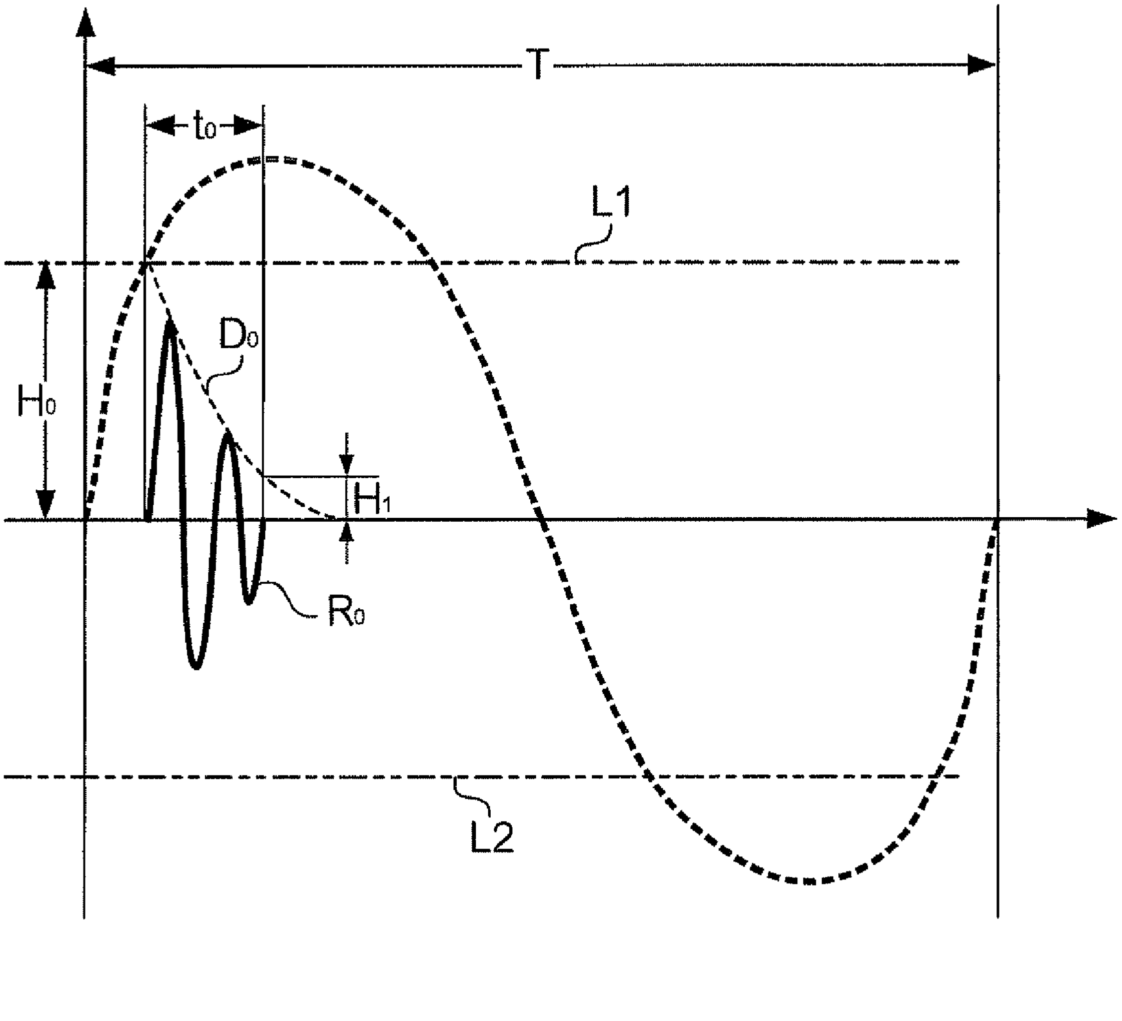
FIG. 8 is a view used to explain a characteristic granted to a waveform signal output by an amplifier.

FIG. 8 is a view used to explain a characteristic granted to a waveform signal output by the amplifier 1042. A waveform signal R0 indicated by a solid line in the figure denotes a transient response waveform caused by a ringing and a waveform indicated by a dotted line denotes a waveform of an alternating magnetic field caused by an excitation coil. A vertical axis in FIG. 8 represents an intensity of magnetic field converted from a voltage value of the current output by the amplifier 1042. A horizontal axis in FIG. 8 represents time. In this figure, T represents an alternating magnetic field cycle. The above-mentioned pulse current is produced due to steep magnetization reversal produced in the magnetic substance wire 10 at the point of time when an absolute value of the intensity of the magnetic field generated by the alternating magnetic field shown in FIG. 8 corresponds to a coercive force H0 of the magnetic substance wire 10. Auxiliary lines L1 and L2 denoted by a two-dot chain line in FIG. 8 represent magnetic field intensities of H0 and −H0, respectively. A pulse current is generated at the point of time when these auxiliary lines L1 and L2 intersect a curve representing the current induced by the alternating field. The amplifier 1042 outputs the waveform signal R0 based on this pulse current.

The characteristic of the amplifier 1042 is adjusted to generate an ideal transient response waveform for a pulse current input. The ideal waveform signal R0 generated by the amplifier 1042 will be described below.

A response by the amplifier 1042 has a second-order proportional element. In general, a transfer function G(s) representing a second-order step response is expressed by the following equation (1).

$$G(s) = \frac{1}{s}\left\{\frac{\omega_n^2}{s^2 + 2\zeta\omega_n s + \omega_n^2}\right\} \quad \text{[Equation 1]}$$

Since the waveform signal R0 generated by the amplifier 1042 has damping vibration, the above transfer function G(s) is reverse Laplace-transformed into a function C(t) which is expressed by the following equation (2).

$$C(t) = 1 - \frac{1}{\sqrt{1-\zeta^2}}\exp(-\zeta\omega_n t)\cdot\cos\left(\omega_n\sqrt{1-\zeta^2 t} - \varphi\right) \quad \text{[Equation 2]}$$

Where, t is time, $\omega_n$ is a natural frequency, $\xi$ is a damping factor, and $\phi$ is a constant.

For the waveform signal R0 generated by the amplifier 1042, time t0 corresponds to 1/10 of one cycle, T, of the alternating magnetic field, that is, a relationship of t0=0.1·T is established. The ideal waveform signal R0 contains two cycles of waveforms, as shown in FIG. 8, before time t0 elapses after the waveform signal is generated. An envelope of the waveform signal is an envelope D0 indicated by a dotted line in FIG. 8. Assuming that a magnetic field intensity for the envelope D0 is H0 at the point of time when the waveform signal is generated and H1 at the point of time when time t0 elapses after the waveform signal is generated, a relationship of H1=0.01·H0 between H1 and H0 is established for the ideal waveform signal R0. That is, the ideal waveform signal R0 is a wave having two cycles at time t0 which is 1/10 of one cycle of the alternating magnetic field, and having an amplitude damped to 1/100 of that at the generation of the waveform signal after time t0 elapses. The amplifier 1042 is adjusted to meet such characteristics.

The above ideal waveform signal is stored in advance in the ROM 302 of the terminal device 300, as time data representing plural points of time and a string of data representing plural amplitude values. The stored ideal waveform is called a reference waveform v(t). A method of measuring this reference waveform v(t) will be described below.

Figure 9:
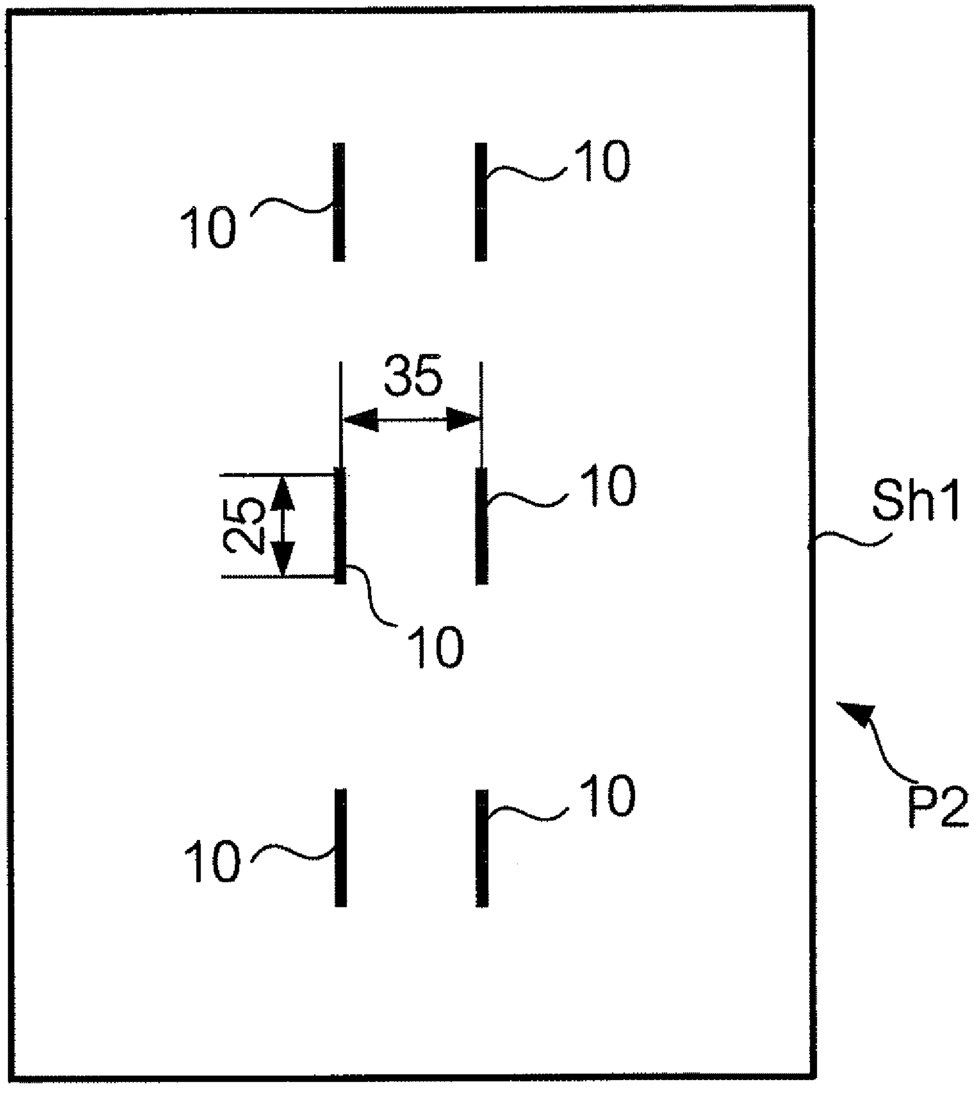
FIG. 9 is a plan view of a reference paper.

FIG. 9 is a plan view of a reference paper P2 used when the reference waveform v(t) is measured. As shown in the same figure, the reference paper P2 includes the magnetic substance wire 10 disposed on the base material Sh1. A characteristic of the base material Sh1 is as described above. The base material Sh1 has an A4 size, for example. A characteristic of the magnetic substance wire 10 is as described above. The magnetic substance wire 10 has a length of 25 mm, for example. The magnetic substance wire 10 is disposed such that it has the same lengthwise direction as the base material Sh1, and two rows of three magnetic substance wires 10 are disposed on the same straight line extending in the lengthwise direction. Distances in the lengthwise direction between the magnetic substance wires 10 in each of the rows are equidistant and the two rows are distant from each other by, for example, 35 mm.

The reference paper P2 is merely one example. The size of the base material and the number and arrangement method of the magnetic substance wires are determined by the configuration of the magnetic substance attached paper actually used.

Figure 10A:
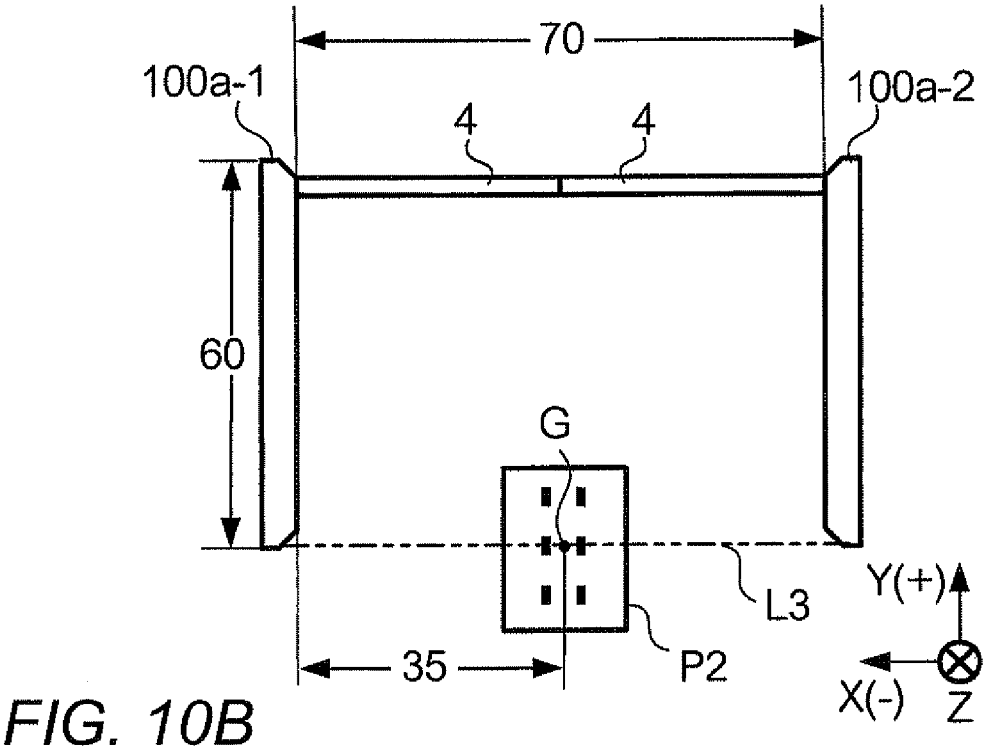
FIGS. 10A and 10B are views showing a position and direction of a reference paper with respect to a gate.
Figure 10B:
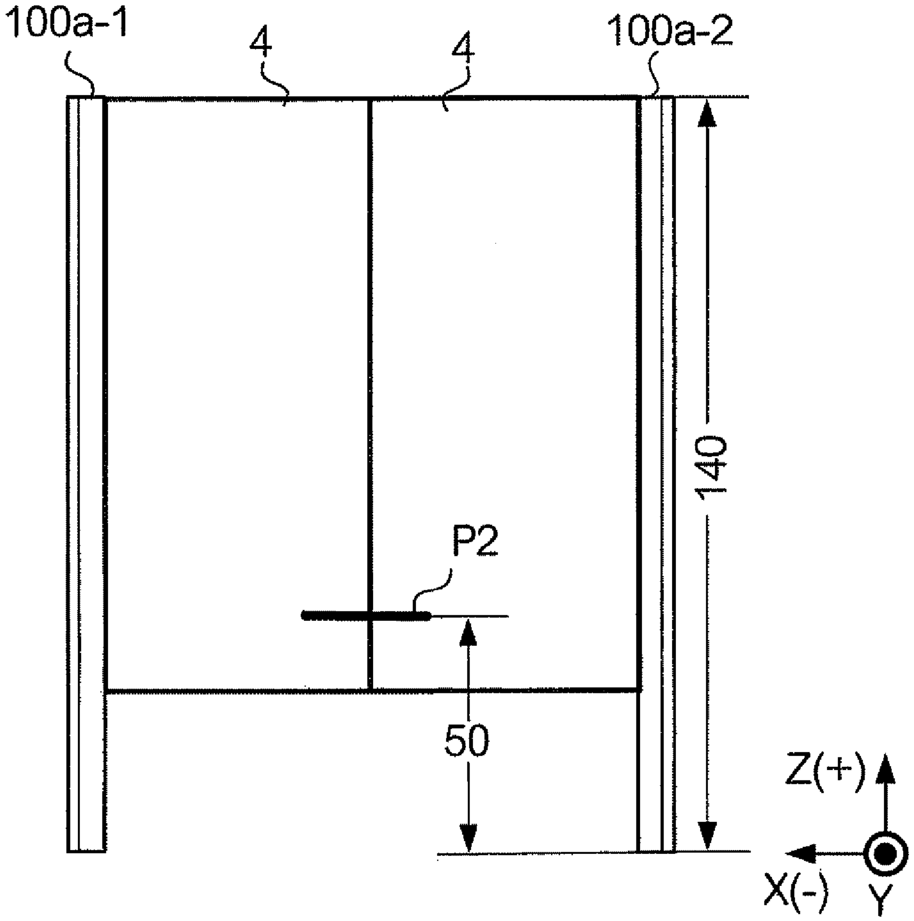

Next, a position and direction of the reference paper P2 relative the gate 100 in measurement of the reference waveform v(t) will be described. FIGS. 10A and 10B are views showing one example of a position and direction of the reference paper P2. FIG. 10A shows the gate 100 shown in FIG. 2 when viewed from a Z(+) direction and FIG. 10B shows the same gate when viewed from a Y(−) direction. In the same figure, the panel 100*a* constituting the gate 100 has a length of 60 cm in the Y direction and a length of 140 cm in the Z direction. In addition, a distance from the panel 100*a*-1 to the panel 100*a*-2 is 70 cm. The reference paper P2 is disposed relative to the gate 100 such that a lengthwise direction of the reference paper P2 coincides with the Y direction. In this case, the center of gravity G of the reference paper P2 lies on a line L3 connecting an end (directing to the inside of the room) of the panel 100*a*-1 and an end (directing to the inside of the room) of the panel 100*a*-2. A distance in the X direction from the center of gravity G to the panel 100*a*-1 is 35 cm. In addition, a distance in the Z direction from the reference paper P2 to a ground point of the panel 100*a* is 50 cm.

Figure 11:
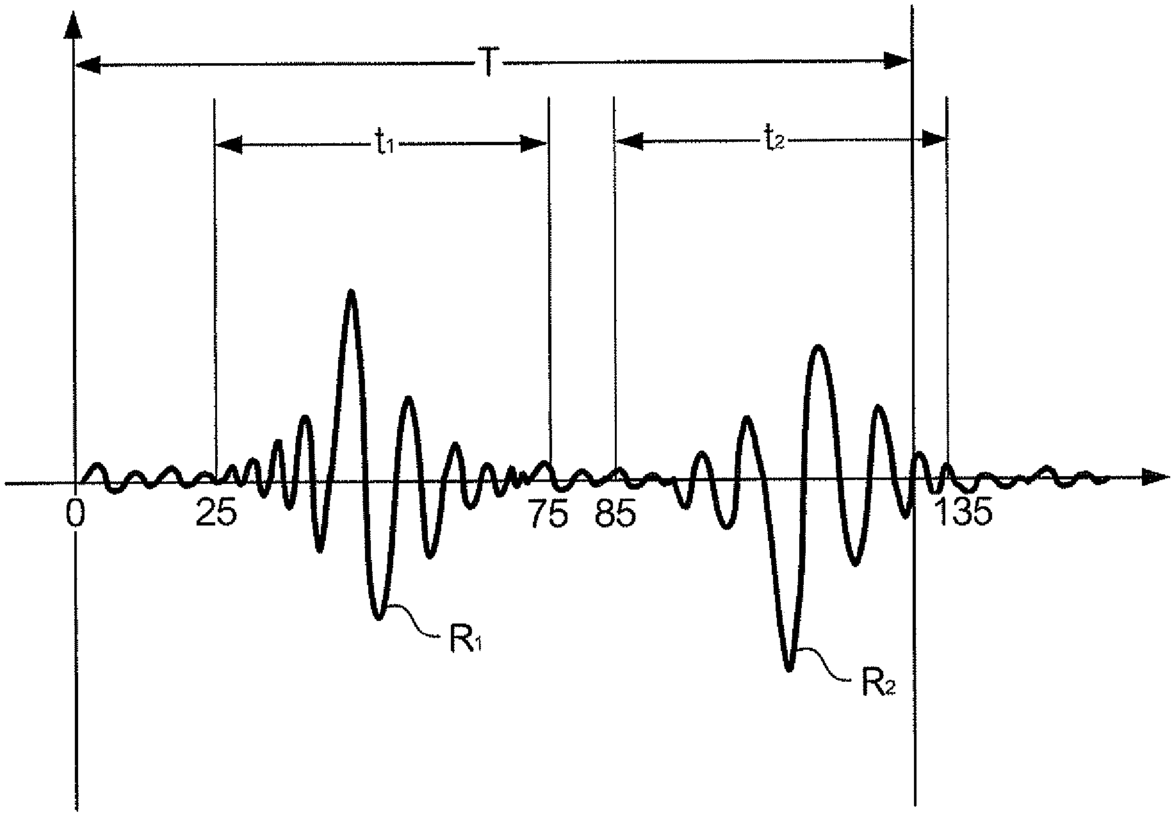
FIG. 11 is a view showing a waveform measured when the reference paper is placed as shown in FIGS. 10A and 10B.

FIG. 11 is a view showing one example of a waveform measured when the reference paper P2 is placed as shown in FIGS. 10A and 10B. In FIG. 11, a vertical axis denotes an amplitude value representing a magnetic field intensity and a horizontal axis denotes time. T denotes a cycle of an alternating magnetic field. When a length of 1/128 of the cycle T is set as one data, an interval t1 is defined as [25, 75]. On the other hand, an interval t2 is defined as [85, 135]. In this embodiment, a partial wavelength R1 belonging to the interval t1 and a partial wavelength R2 belonging to the interval t2 are stored in the ROM 302 of the terminal device 300, as a reference waveform v1(*t*) and a reference waveform v2(*t*), respectively.

Figure 12A:
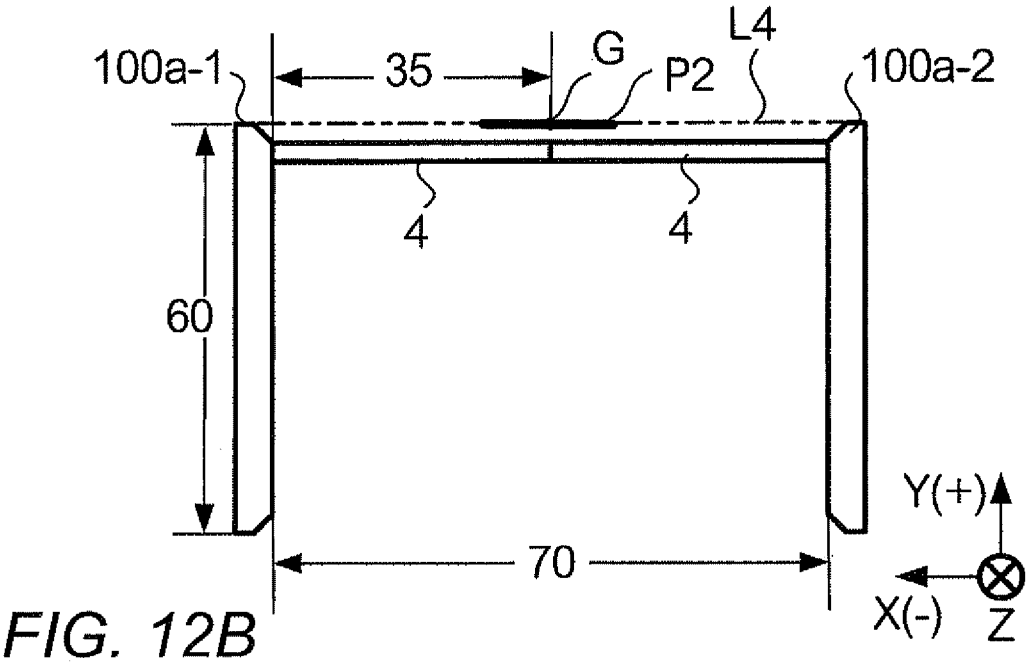
FIGS. 12A and 12B are views showing a position and direction of a reference paper with respect to a gate.
Figure 12B:
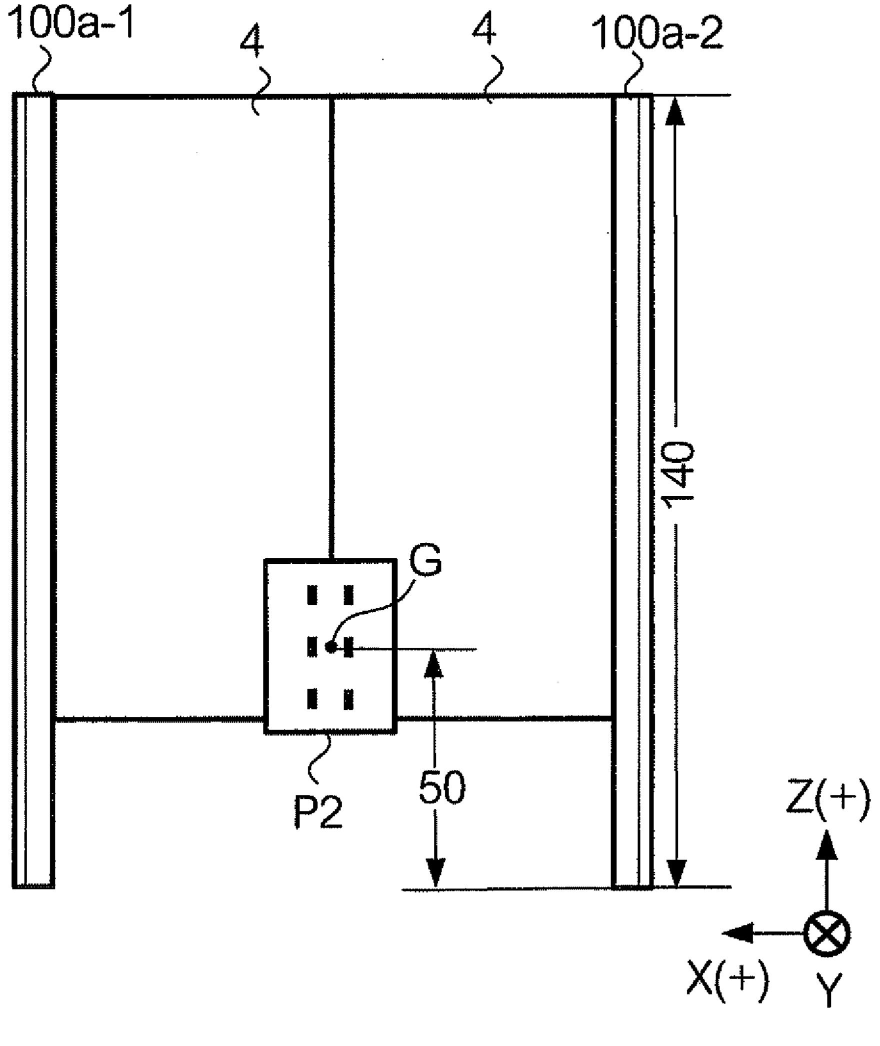

FIGS. 12A and 12B are views showing another example of the position and direction of the reference paper P2. FIG. 12A shows the gate 100 shown in FIG. 2 when viewed from the Z(+) direction and FIG. 12B shows the same gate when viewed from the Y(+) direction. In the same figure, the gate 100 has the same configuration as that of FIGS. 10A and 10B. The reference paper P2 is disposed relative to the gate 100 such that a lengthwise direction of the reference paper P2 coincides with the Z direction. In this case, the reference paper P2 is placed on a line L4 connecting an end (directing to the hallway 3) of the panel 100*a*-1 and an end (directing to the hallway 3) of the panel 100*a*-2. A distance in the X direction from the center of gravity G to the panel 100*a*-1 is 35 cm. In addition, a distance in the Z direction from the center of gravity P of the reference paper P2 to a ground point of the panel 100*a* is 50 cm.

Figure 13:
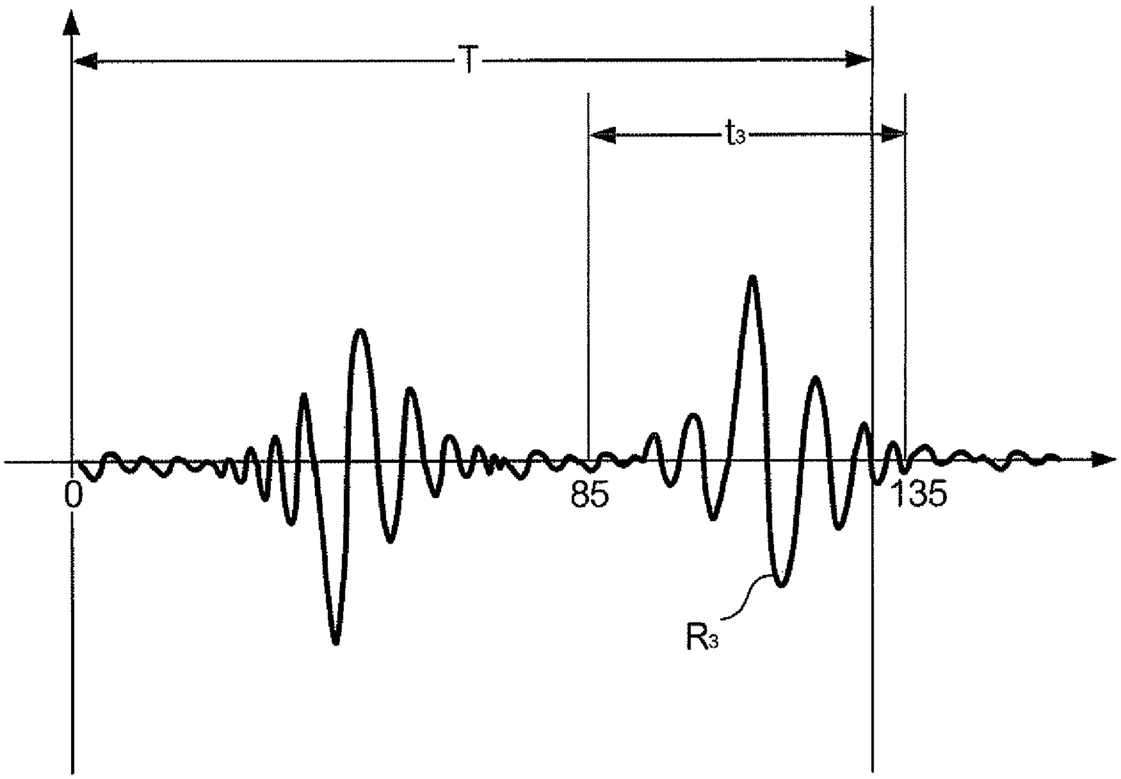
FIG. 13 is a view showing a waveform measured when the reference paper is placed as shown in FIGS. 12A and 12B.

FIG. 13 is a view showing one example of a waveform measured when the reference paper P2 is placed as shown in FIGS. 12A and 12B. In FIG. 13, a vertical axis denotes an amplitude value representing a magnetic field intensity and a horizontal axis denotes time. T denotes a cycle of an alternating magnetic field. When a length of 1/128 of the cycle T is set as one data, an interval t3 is defined as [85, 135]. In this embodiment, a partial wavelength R3 belonging to the interval t3 is stored in the ROM 302 of the terminal device 300, as a reference waveform v3(*t*).

As described above, in this embodiment, the three reference waveforms v1(*t*), v2(*t*) and v3(*t*) (hereinafter being represented by a reference waveform v(t) when they are not distinguished) are stored in the ROM 302 of the terminal device 300. The number of stored reference waveforms is not limited to three but may be two or more.

In the above description, the configuration of the gate 100 described with reference to FIGS. 10 and 12 is merely one example but other configurations are possible. This is equally applied to an arrangement and direction of the reference paper P2 in measurement of the reference waveform v(t).

In addition to the reference waveform v(t), a threshold Rx is stored in the ROM 302 of the terminal device 300. The threshold Rx is a value used by the CPU 301 to determine whether or not a paper detected by the detecting unit 104 is the magnetic substance attached paper P1.

The ADC 1043-1 and the ADC 1043-2, which are AD converters, convert outputs of the amplifier 1042-1 and the amplifier 1042-2 into digital data, respectively, which are then output to the terminal device 300.

Next, as shown in FIG. 1, a copier 200 is provided inside the storage chamber 2. A user may use the copier 200 to copy an image of the paper P0 or the magnetic substance attached paper P1 accommodated in the shelf 5.

Figure 14:
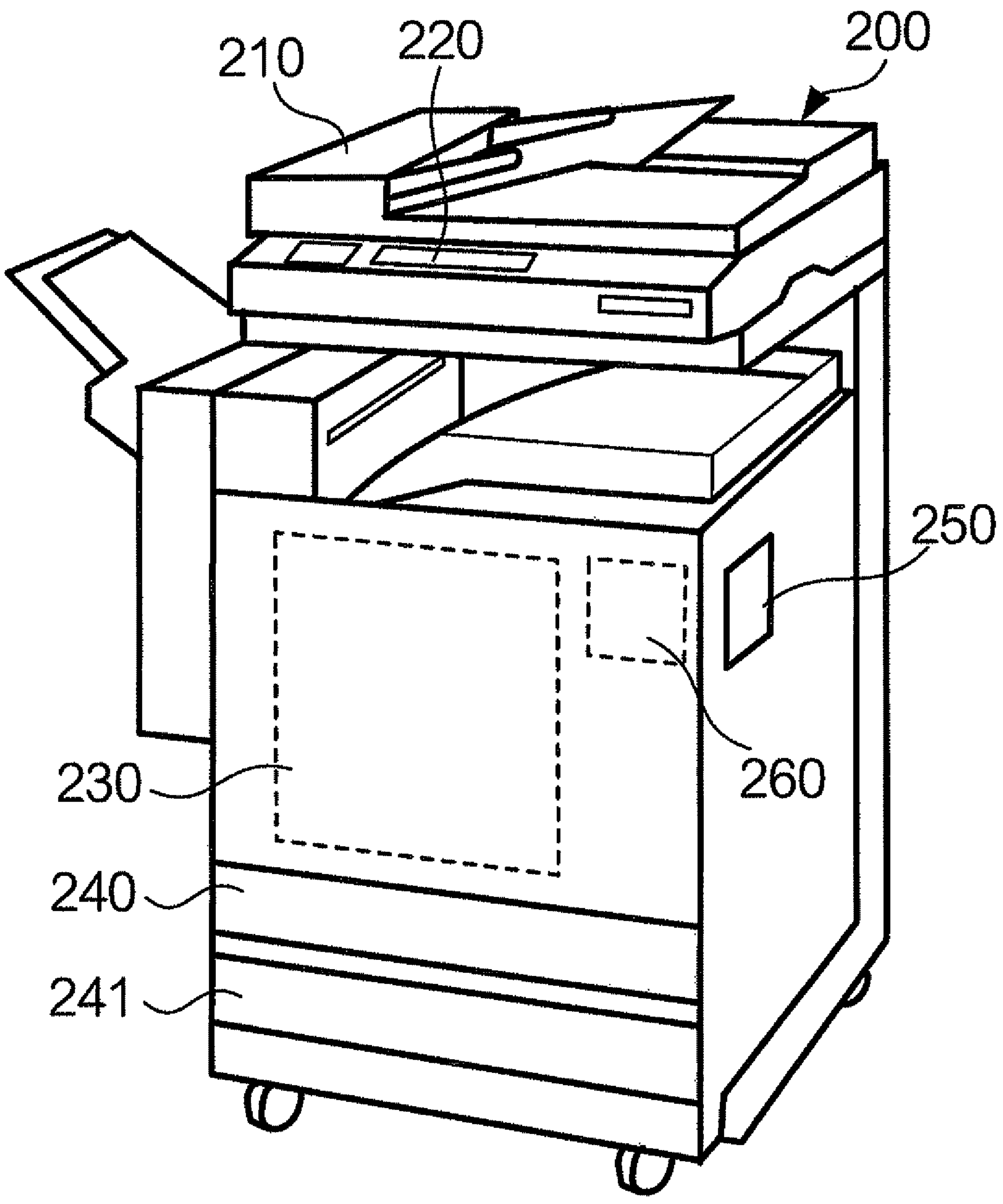
FIG. 14 is a view showing a copier.

FIG. 14 is a configuration view of the copier 200. The copier 200 is provided with a communicating unit 250 in a connection to a communication line. Upon receiving a signal via the communication line, the communicating unit 250 supplies the signal to a control unit 260. The control unit 260 is provided inside a housing of the copier 200 and controls the entire operation of the copier 200. An operating unit 220 is provided at a user operating side and receives an instruction to start a copying operation, an input of operation setting, etc. An image reading unit 210 provided on the top of the copier 200 reads an image of a set document and converts the read image into image data. An image forming unit 230 provided inside the copier 200 converts the image data obtained by the image reading unit 210 into a toner image, transfers the toner image onto a paper conveyed from one of a first paper supplying unit 240 and a second paper supplying unit 241 and discharges the paper.

In this embodiment, the second paper supplying unit 241 accommodates blank magnetic substance attached papers P1 and the first paper supplying unit 240 accommodates blank papers P0.

Returning to FIG. 1, a gate 110 is provided at a side having the operating unit 220 of the copier 200. The gate 110 includes two opposing panels extending in a direction in which a user who operates the copier 200 stands from near the both end side having the operating unit 220 of the copier 200. The gate 110 has the same configuration as the gate 100 and, therefore, the same elements of the gate 110 are denoted by the same reference numerals and explanation thereof will not be repeated. The user who uses the copier 200 is necessarily positioned in a space of the gate 110.

A terminal device 310 performs a control to select a copying paper to be used by the copier 200 based on a signal supplied from the gate 110. The terminal device 310 has the same configuration as the terminal device 300 and, therefore, the same elements of the terminal device 310 are denoted by the same reference numerals and explanation thereof will not be repeated.

[B. Operation]

Next, operation of an embodiment will be described. Operation by a user in the storage chamber 2 of taking a magnetic substance attached paper P1 out of a file accommodated in the shelf 5 and getting out of the door 4 will be described below.

Figure 15:
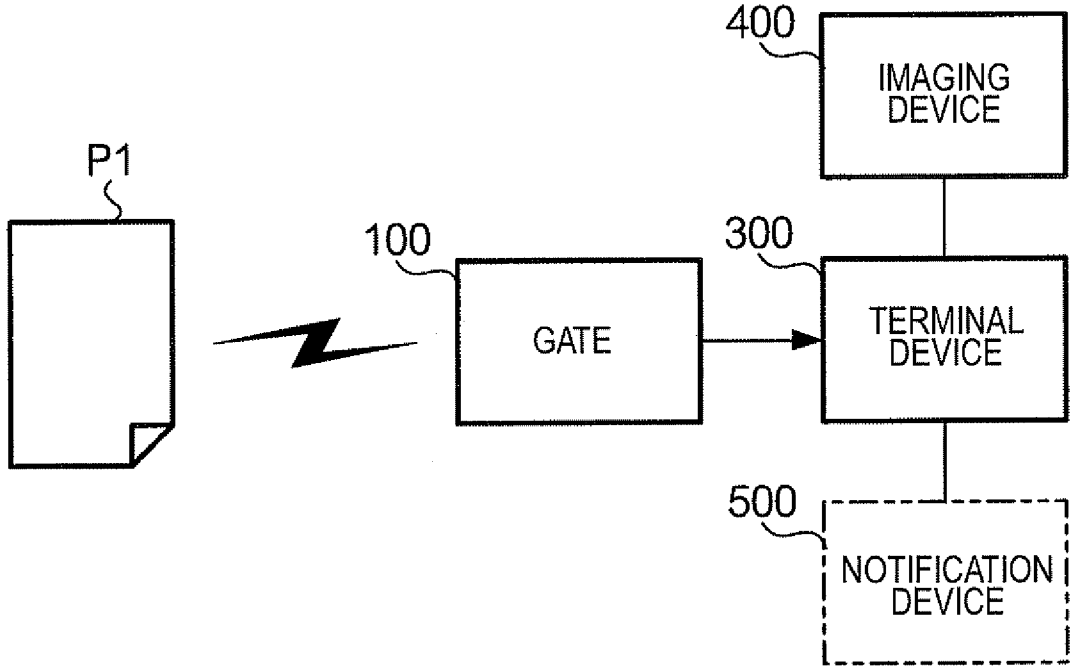
FIG. 15 is a view showing a gate, a terminal device, an imaging device and a notifying device.

When the user moves with the magnetic substance attached paper P1 and enters the gate 100, steep magnetization reversal is generated in the magnetic substance wire 10 by an alternating magnetic field formed in the gate 100. The steep magnetization reversal of the magnetic substance wire 10 changes a magnetic flux passing through the detection coil 102 in the gate 100, thereby allowing a current to flow into the detection coil 102. The detecting unit 104 detects the current flowing into the detection coil 102 and outputs a waveform signal based on the detected current to the terminal device 300 (see FIG. 15).

Figure 16:
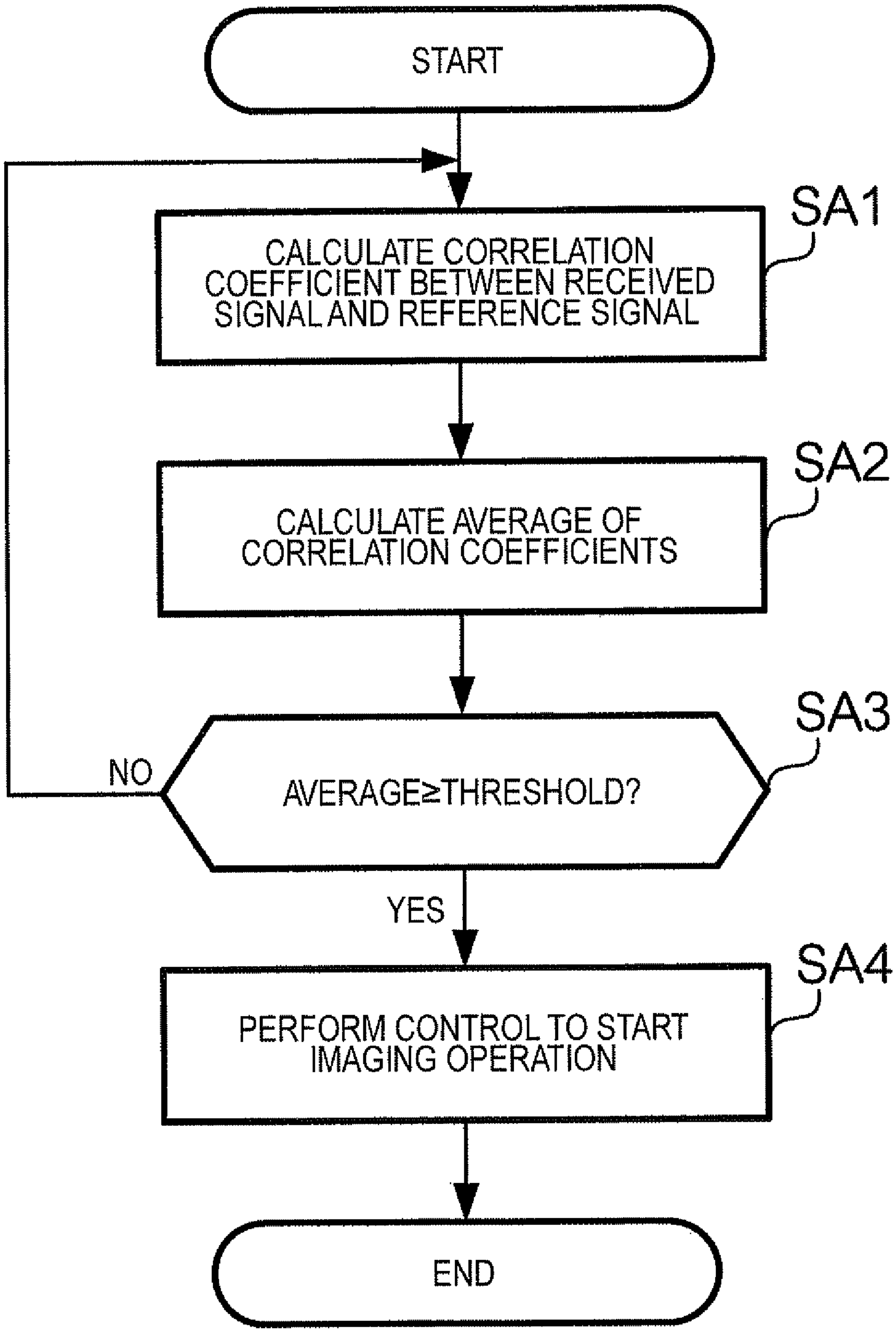
FIG. 16 is a flow diagram showing a process of operation of a terminal device.

FIG. 16 is a flow diagram showing a process of operation of the terminal device 300. As described above, the reference waveform v(t) (specifically, the reference waveforms v1(*t*), v2(*t*) and v3(*t*)) and the threshold Rx are stored in advance in the ROM 302 of the terminal device 300. Upon receiving a signal u(t) output from the detecting unit 104 of the gate 100 via the communicating unit 305, the CPU 301 of the terminal device 300 calculates a correlation coefficient R(t) between a waveform of the received signal u(t) and the reference waveform v(t) (Step SA1). More specifically, the CPU 301 calculates a correlation coefficient R1(*t*) between a waveform of the signal u(t) and the reference waveform v1(*t*), calculates a correlation coefficient R2(*t*) between a waveform of the signal u(t) and the reference waveform v2(*t*), and calculates a correlation coefficient R3(*t*) between a waveform of the signal u(t) and the reference waveform v3(*t*) (hereinafter being represented by a correlation coefficient R(t) when they are not distinguished).

Here, the correlation coefficient R(t) will be described. With the reference waveform v(t) and the signal u(t) output from the detecting unit 104 as real number continuous functions, respectively, the correlation coefficient R(t) is expressed by the following equation (3) using an integration interval [0, t0].

$$R(t) = \frac{\int_0^{t0} v(\tau)\cdot u(\tau+t)d\tau}{\int_0^{t0} v(\tau)d\tau \cdot \int_0^{t0} u(\tau+t)d\tau} \quad \text{[Equation 3]}$$

In other words, the correlation coefficient R(t) is obtained by dividing a result of integrating a product of a reference waveform v(τ) and a signal u(τ+t) (i.e., v(τ)·u(τ+t)) in a domain [0, t0] by a product of an integration of the reference waveform v(t) and an integration of the signal u(τ+t) in the domain [0, t0] at any time t. The correlation coefficient R(t) is a function of time t and assumes a real number of equal to or more than −1 and equal to or less than 1. It can be seen from R(t) that v(t) and u(t) have a positive correlation and similar shape at time t close to 1.

Since the domain of the reference waveform v1(*t*) is [25, 75], the CPU 301 calculates the correlation coefficient R1(*t*) by performing an integration in this domain. Since the domain of the reference waveform v2(*t*) is [85, 135], the CPU 301 calculates the correlation coefficient R2(*t*) by performing an integration in this domain. In addition, since the domain of the reference waveform v3(*t*) is [85, 135], the CPU 301 calculates the correlation coefficient R3(*t*) by performing an integration in this domain.

In addition, in calculating the reference coefficient R(t), a phase of the reference waveform v(t) may be shifted by, for example, ±5 data. In this case, a value of the calculated correlation coefficient increases and a probability of omission of detection by the magnetic substance decreases.

Figure 17:
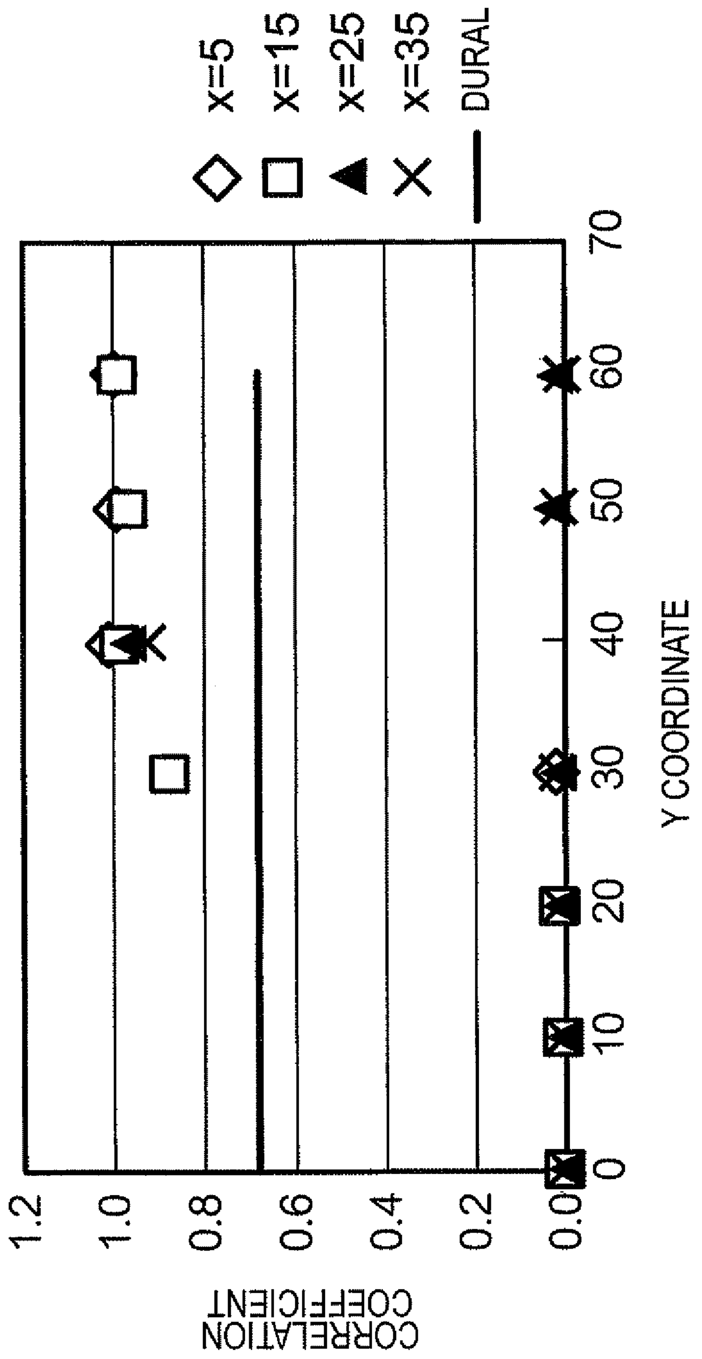
FIG. 17 is a view showing a correlation coefficient between a reference waveform and a received signal waveform.
Figure 18:
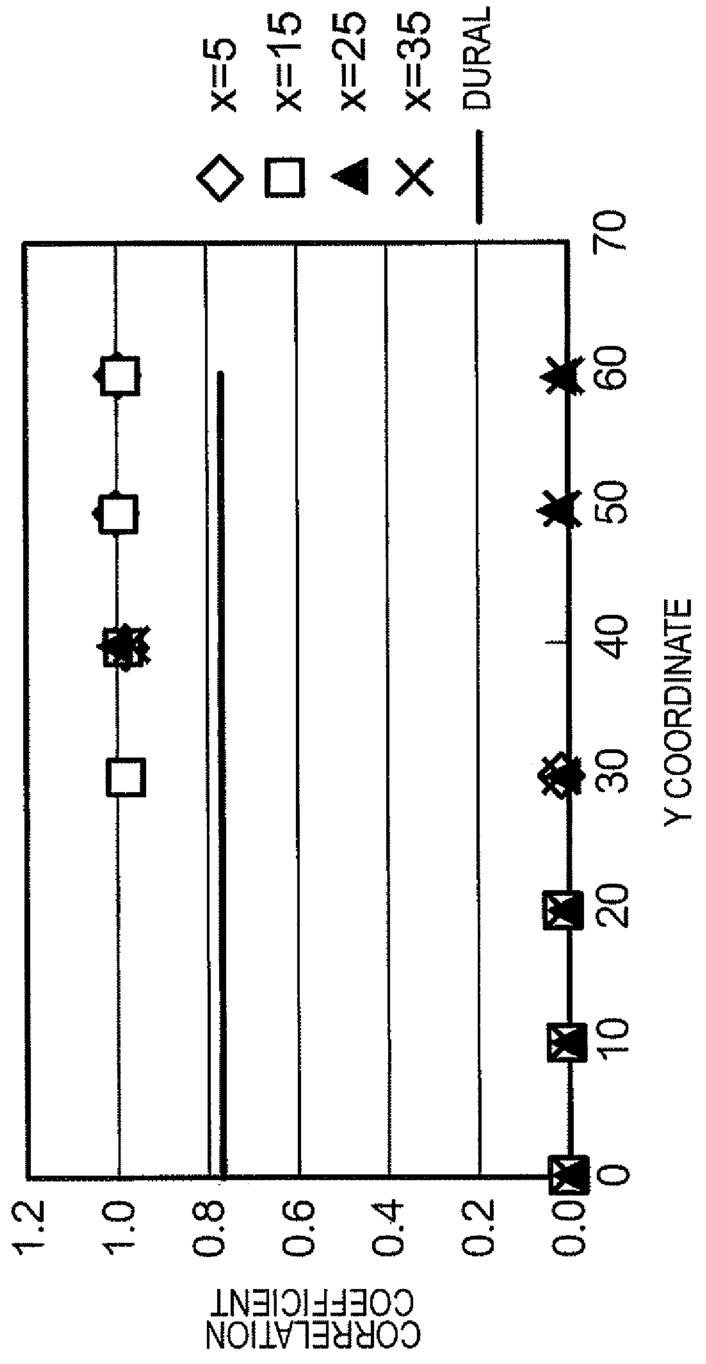
FIG. 18 is a view showing a correlation coefficient between a reference waveform and a received signal waveform.
Figure 19:
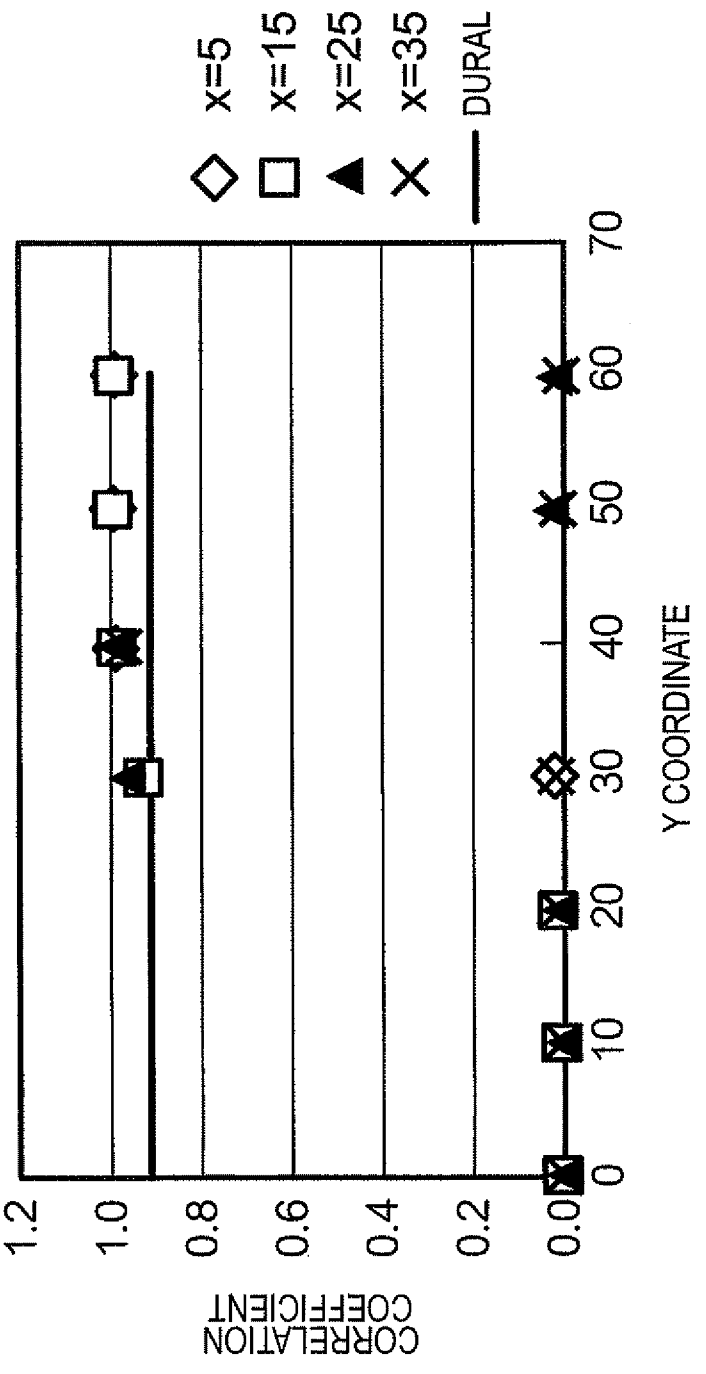
FIG. 19 is a view showing a correlation coefficient between a reference waveform and a received signal waveform.

FIGS. 17 to 19 are views showing one example of the correlation coefficient R(t) between the reference waveform v(t) and the signal u(t) waveform. Specifically, FIG. 17 is a view showing one example of the correlation coefficient R1(*t*) between the reference waveform v1(*t*) and the signal u(t) waveform, FIG. 18 is a view showing one example of the correlation coefficient R2(*t*) between the reference waveform v2(*t*) and the signal u(t) waveform, and FIG. 19 is a view showing one example of the correlation coefficient R3(*t*) between the reference waveform v3(*t*) and the signal u(t) waveform.

In these figures, a vertical axis denotes a correlation coefficient and a horizontal axis denotes a position in the Y direction (Y coordinate) of the magnetic substance attached paper P1 (or a duralumin case which will be described later) relative to the gate 100. Here, for example, a Y coordinate of "10" means that the magnetic substance attached paper P1 (or the duralumin case) is positioned ahead of the auxiliary line L3 by 10 cm in the Y(+) direction. X shown in the example of the figures denotes a position in the X direction (X coordinate) of the magnetic substance attached paper P1 relative to the gate 100. For example, an X coordinate of "5" means that the magnetic substance attached paper P1 is positioned apart by 5 cm from the panel 100*a*-1 in the X(+) direction in the example of FIG. 10A. "Dural" shown in the example of the figures denotes the duralumin case.

In these figures, the correlation coefficient R(t) is a value calculated when the magnetic substance attached paper P1 passes the gate 100 with its lengthwise direction inclined to coincide with the Z direction. In addition, in calculating the correlation coefficient R(t), the phase of the reference waveform v(t) is shifted by ±7 data to prevent omission of detection by the magnetic substance. In addition, in these figures, in order to avoid graphical complication, a value of the correlation coefficient R(t) is set to "0" when the maximum value of the amplitude of the signal u(t) is below 65% of the maximum value of the amplitude of the reference waveform v(t).

In the example of these figures, for the magnetic substance attached paper P1, the correlation coefficient R(t) approximate to 1.0 is calculated when the Y coordinate is "40" for any reference waveform v(t), irrespective of a value of the X coordinate. Specifically, the correlation coefficient R(t) ranging from 0.93 to 0.99 is calculated. On the other hand, for the duralumin case, the correlation coefficients R(t) of 0.69 and 0.76 are calculated for the reference waveforms v1(*t*) and v2(*t*), respectively, while the correlation coefficient R(t) of 0.91 is calculated for the reference waveforms v3(*t*). That is, a difference in correlation coefficient R(t) between the magnetic substance attached paper P1 and the duralumin case is only 0.02 to 0.08 for the reference waveform v3(*t*).

Returning to FIG. 16, subsequently, the CPU 301 of the terminal device 300 calculates an average of the correlation coefficients R1(*t*), R2(*t*) and R3(*t*) calculated in Step SA1 (Step SA2). Then, the CPU 301 determines whether or not the average calculated in Step SA2 is equal to or more than the threshold Rx (e.g., 0.85) (Step SA3). When a result of this determination is NO, that is, when the average is below the threshold Rx (NO in Step SA3), the terminal device 300 enters a standby mode (Step SA1).

On the other hand, when a result of this determination is YES, that is, when the average is equal to or more than the threshold Rx (YES in Step SA3), this means that the CPU 301 detects the magnetic substance. Accordingly, the CPU 301 determines that a paper in question is the magnetic substance attached paper P1, and transmits a detection signal indicating such detection to the imaging device 400 via a communication line, thereby performing a control to start an imaging operation (Step SA4).

Figure 20:
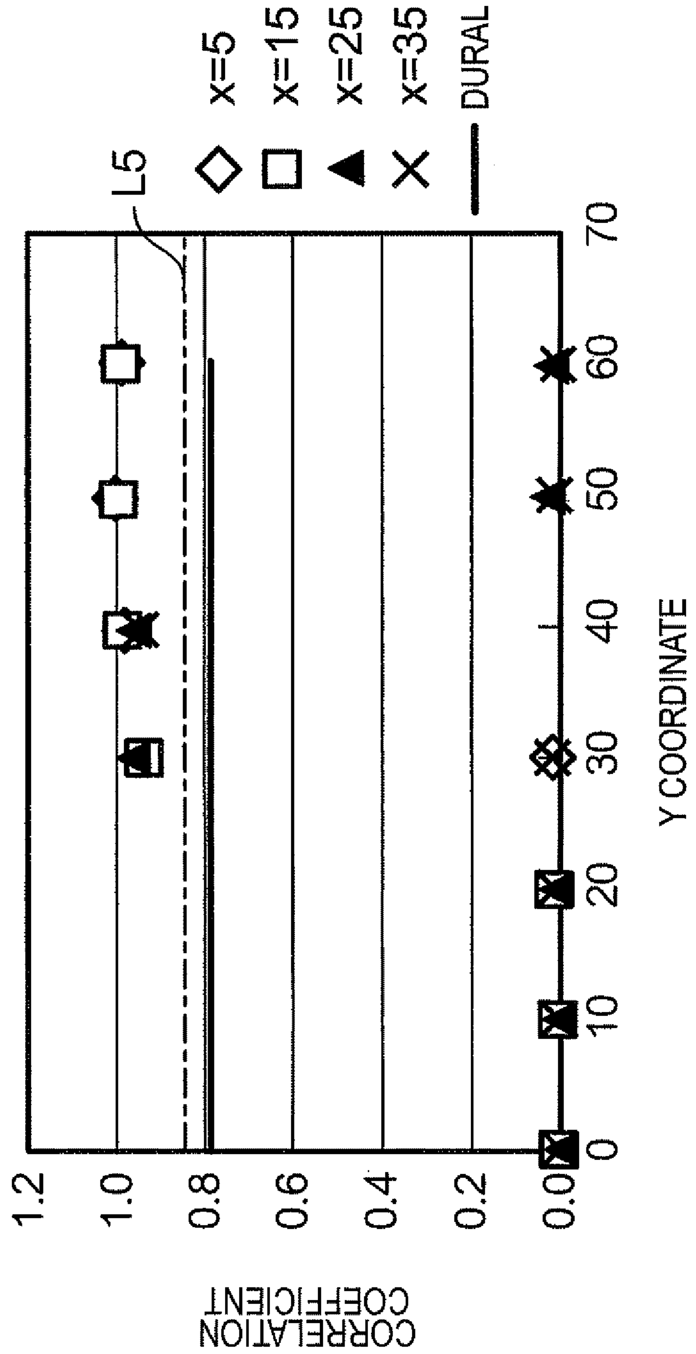
FIG. 20 is a view showing an average of correlation coefficients.
Figure 21:
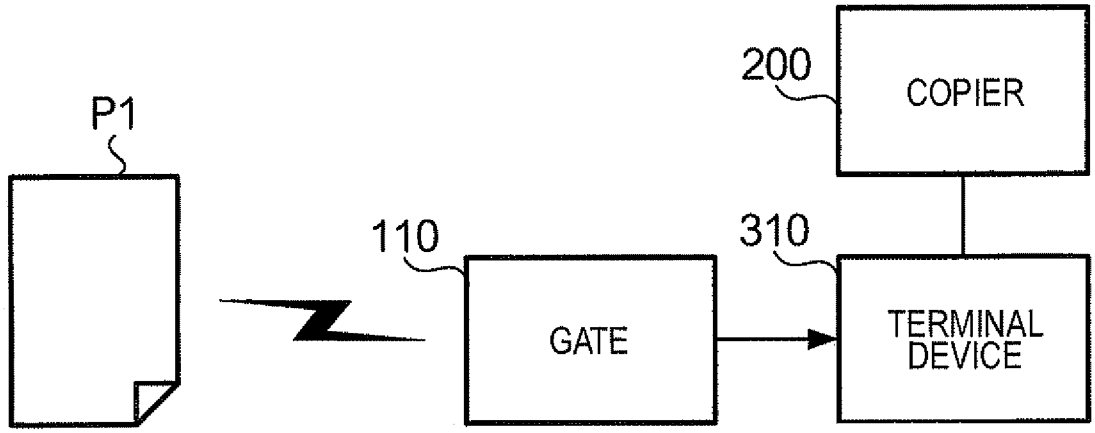
FIG. 21 is a view showing a gate, a terminal device and a copier.

FIG. 20 is a view showing an example of the average calculated in Step SA3. In this figure, a vertical axis denotes a correlation coefficient and a horizontal axis denotes a position in the Y direction (Y coordinate) of the magnetic substance attached paper P1 (or the duralumin case) relative to the gate 100. X shown in the example of the figure denotes a position in the X direction (X coordinate) of the magnetic substance attached paper P1 relative to the gate 100. "Dural" shown in the example of the figure denotes the duralumin case. An auxiliary line L5 in the figure denotes a threshold Rx (0.85).

In the example of this figure, for the magnetic substance attached paper P1, an average exceeding the threshold Rx is calculated when the Y coordinate is "40," irrespective of a value of the X coordinate. On the other hand, for the duralumin case, irrespective of a value of the Y coordinate, an average becomes 0.79 without exceeding the threshold Rx.

Returning to FIG. 16, the imaging device 400, which is in the standby mode where no imaging operation is performed under an initial state after being powered-on, starts an imaging operation upon receiving a detection signal from the terminal device 300 to start the imaging operation.

In more detail, first, the fixed lens 490 images an area around the door 4 in an imaging direction of the fixed lens 490 and an image obtained thus is formed on the CCD sensor 450. The image formed on the CCD sensor 450 is output, as an analog signal, to the image processing unit 451. The CCD sensor 450 performs this operation for 30 frames per second, for example. The image processing unit 451 converts the analog signal supplied thereto into digital image data which are then output to and stored in the recorder 402.

According to the above processes, an image of a user who carries the magnetic substance attached paper P1 and passes through the gate 100 is formed as a moving picture.

The terminal device 300 has also a time count function which instructs the imaging device 400 to stop the imaging operation when a preset period of time elapses. According to this instruction, the imaging device 400 stops the imaging operation and returns to the standby mode. This preset period of time may be preset to be sufficient for the user to pass through an imaging range of the imaging device 400, thereby providing less wasteful imaging information.

According to the above processes, when the magnetic substance attached paper P1 is taken out of the storage chamber 2, the user who takes out the magnetic substance attached paper P1 is imaged by the imaging device 400 and an image of the user is recorded with the recorder 402. When the user takes out the paper P0 via the gate 100, the above-mentioned imaging and notification is not performed since a result of the determination in Step SA1 is "NO."

As a result, the image of the user is stored only when a document of great importance is taken out, requiring no superfluous memory capacity.

Next, operation by the user in the storage chamber 2 of taking the magnetic substance attached paper P1 out of the shelf 5 and using the copier 200 to copy an image of the paper will be described below. The user who uses the copier 200 is positioned in the space defined by the panel of the gate 110. Since an alternating magnetic field is formed as in the gate 100, steep magnetization reversal is produced in the magnetic substance wire 10, for example when the magnetic substance attached paper P1 is taken in the gate 110. This allows a current to flow into the detection coil 102 provided in the gate 110 and the detecting unit 104 outputs a signal based on an amount of current to the terminal device 310 (see FIG. 15).

Figure 22:
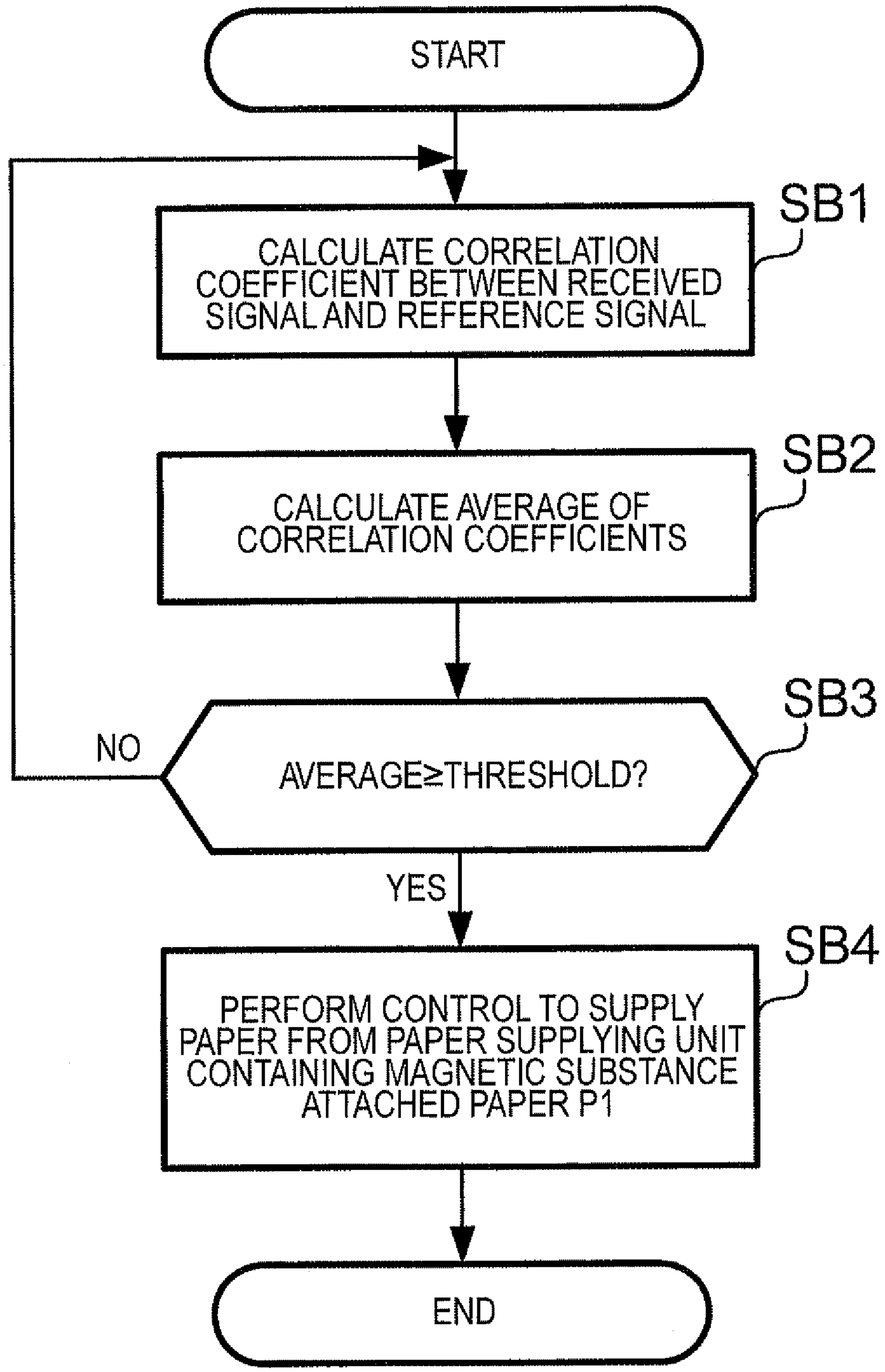
FIG. 22 is a flow diagram showing a process of operation of a terminal device.

FIG. 22 is a flow diagram showing a process of operation of the terminal device 310. Upon receiving a signal u(t) output from the detecting unit 104 of the gate 110, the CPU 301 of the terminal device 310 calculates a correlation coefficient R(t) between a waveform of the received signal u(t) and the reference waveform v(t) (Step SB1). More specifically, the CPU 301 calculates a correlation coefficient R1(*t*) between a waveform of the signal u(t) and the reference waveform v1(*t*), calculates a correlation coefficient R2(*t*) between a waveform of the signal u(t) and the reference waveform v2(*t*), and calculates a correlation coefficient R3(*t*) between a waveform of the signal u(t) and the reference waveform v3(*t*).

Subsequently, the CPU 301 of the terminal device 300 calculates an average of the correlation coefficients R1(*t*), R2(*t*) and R3(*t*) calculated in Step SB1 (Step SB2). Then, the CPU 301 determines whether or not the average calculated in Step SB2 is equal to or more than the threshold Rx (Step SB3). When a result of this determination is NO (NO in Step SB3), the terminal device 300 enters the standby mode (Step SB1). On the other hand, when a result of this determination is YES (YES in Step SB3), this case means that the CPU 301 detects the magnetic substance. Accordingly, the CPU 301 determines that a paper in question is the magnetic substance attached paper P1, selects a paper supplying unit accommodated with the magnetic substance attached paper P1 when a copy starting instruction is input to the copier 200, and performs a control to supply the paper from the paper supplying unit (Step SB4).

When the terminal device 300 performs the control to supply the paper from the second paper supplying unit 241, the copier 200 designates the second paper supplying unit 241 as a paper supplying unit and waits. When the magnetic substance attached paper P1 is set, as a document, on the image reading unit 210 and the copy starting instruction is input to the operating unit 220, an image of the magnetic substance attached paper P1 is read and converted into image data by the image reading unit 210. The image forming unit 230 converts the image data into a toner image, transfers the toner image onto the magnetic substance attached paper P1 supplied from the designated second paper supplying unit 241, and discharges the paper P1 with the toner image transferred thereunto out of the copier.

Thus, when the magnetic substance attached paper P1 is copied, as a document, by the copier 200, the printed matter is copied on the magnetic substance attached paper P1 similar to the document.

To sum up the above processes, when an instruction to start an operation is input to the operating unit 220 of the copier 200 after the magnetic substance attached paper P1 passes through the gate 110, the paper P1 is selected as a paper to be copied. Then, even when a copied paper is taken out of the door 4, an image of the user who takes out the copied paper is taken by the imaging device 400 and recorded with the recorder 402, as described above. In addition, when the user attempts to take the paper P0 out of the shelf and copy it, the determination in Step SB3 becomes "NO", whereby the copier 200 selects the first paper supplying unit 240 as a result. In addition, when the copier 200 is instructed to perform a copying operation, an image of the paper P0 as a document is copied on an ordinary paper P0 to achieve a normal copying.

[C. Modifications]

While the exemplary embodiments of the invention have been illustrated above, the present invention may be practiced in various forms without being limited to the disclosed embodiments. These various forms may be used in combination.

(1) Although a paper carried with the magnetic substance wire 10 is detected in the above embodiments, an object to be detected is not limited to such a paper. For example, an article, a price tag, an ID card, a file containing a plurality of papers, etc., having the magnetic substance wire 10, may be detected. In addition, although an imaging state, selection of a copying paper, etc. are controlled based on an output signal from the detecting unit 104 in the above embodiments, operation is not limited thereto but operation preset based on the correlation coefficient R(t) calculated by the CPU 301 may be optionally performed. Such operation may be considered to include notification by telephone, determination regarding permission and prohibition of copying, etc.

Such operation may also be considered to include operations unrelated to security, such as alerting a detection result. For example, in manufacturing magnetic substance attached papers P1 containing the magnetic substance wire 10 in a factory, a simple alert may be sufficient when it is tested whether or not a manufactured magnetic substance attached paper P1 is correctly detected. In short, in various processes requiring detection of a magnetic substance placed under an alternating magnetic field, any operation may be possible as long as a preset operation can be performed based on a detection signal output from a detecting device.

For example, the following embodiment may be used in a case where "notification by telephone" is employed as the above operation.

A notification device 500 is connected to the terminal device 300 via a communication line, as indicated by a broken line in FIG. 1. The notification device 500 has a modem function allowing for communication via a general public network. Under control of the terminal device 300, the notification device 500 calls a telephone number of a notification destination and sends a signal via the general public network and, when the telephone is on the line, transmits pre-stored voice data. The notification device 500 stores, a telephone number of a mobile phone of a guard as a notification destination telephone number, as well as a message, such as "Important document taken out," as voice data.

Upon determining that a paper detected by the detecting unit 104 is the magnetic substance attached paper P1, the CPU 301 of the terminal device 300 controls the notification device 500 to start a notification. Upon being instructed by the terminal device 300 to start the notification, the notification device 500 calls the stored telephone number of the mobile phone of the guard and sends a signal via the general public network from a telephone modular jack connected by a cable or the like. Here, when the mobile phone of the guard is on the line, the notification device 500 sends a voice message, such as "Important document taken out," via the general public network.

(2) In the above embodiment, the CPU 301 of the terminal device 300 calculates a correlation coefficient R(t) between each reference waveform v(t) and the signal u(t) and determines that a magnetic substance is detected when an average of the correlation coefficient R(t) is equal to or more than the threshold Rx. Alternatively, instead of calculating the average, the CPU 301 may calculate a difference between the maximum value and the minimum value of the correlation coefficient R(t) and determine that a magnetic substance is detected when the difference is below a threshold Ry.

Figure 23:
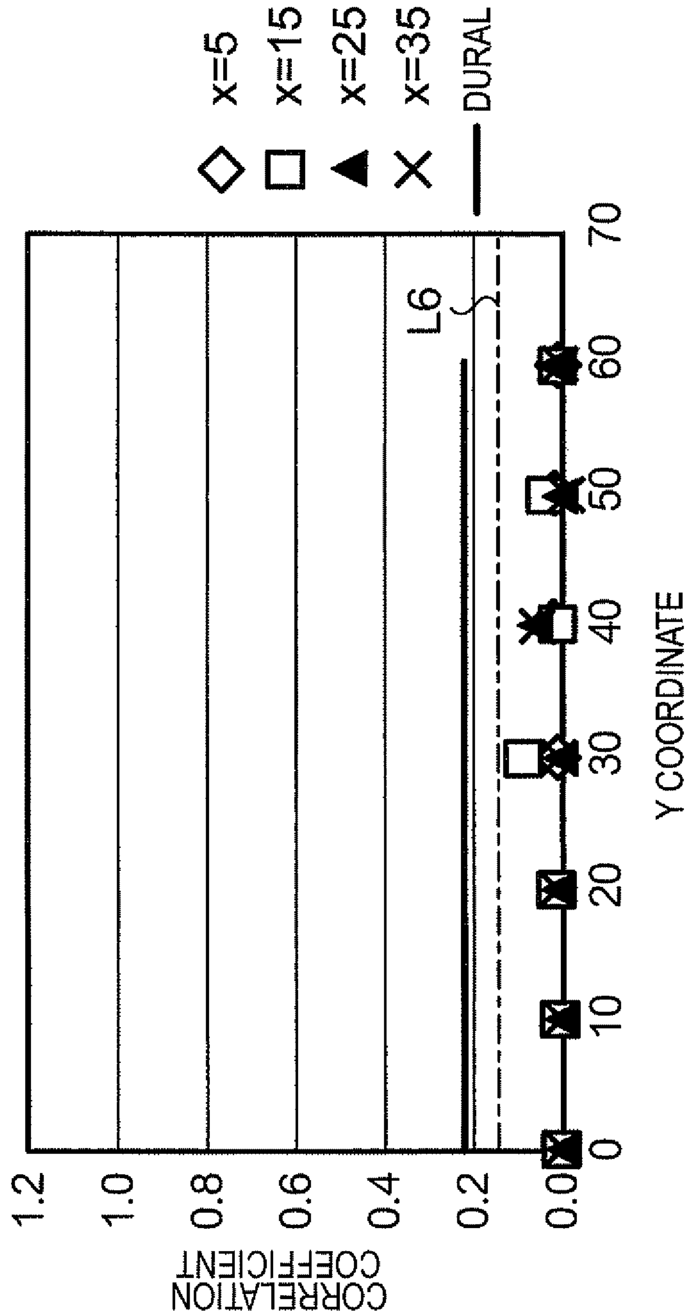
FIG. 23 is a view showing a difference between a maximal value and a minimal value of a correlation coefficient.

FIG. 23 is a view showing one example of a difference between the maximal value and the minimal value of a correlation coefficient R(t). In this figure, a vertical axis denotes a correlation coefficient and a horizontal axis denotes a position in the Y direction (Y coordinate) of the magnetic substance attached paper P1 (or the duralumin case) relative to the gate 100. X shown in the example of the figure denotes a position in the X direction (X coordinate) of the magnetic substance attached paper P1 relative to the gate 100. "Dural" shown in the example of the figure denotes the duralumin case. An auxiliary line L6 in the figure denotes a threshold Ry (0.15).

In the example of this figure, for the magnetic substance attached paper P1, the difference between the maximal value and the minimal value of the correlation coefficient R(t) is below the threshold Ry irrespective of values of the X and Y coordinates. On the other hand, for the duralumin case, irrespective of a value of the Y coordinate, the difference between the maximal value and the minimal value of the correlation coefficient R(t) becomes 0.23 without being less than the threshold Rx.

(3) In the above embodiment, the CPU 301 of the terminal device 300 may omit the calculation of the correlation coefficient R(t) of the received signal u(t) and the reference waveform v(t) when a radio of the maximum value of the amplitude of the signal u(t) to the maximum value of the amplitude of the reference waveform v(t) is below a threshold Rz (for example, 0.65).

(4) Although one imaging device 400 is installed on the wall of the hallway 3 facing a user who opens the door 4 to get out of the storage chamber 2, as shown in FIG. 1, in the above embodiment, the imaging device 400 may be installed on other positions including the front side inclined to the left side of the wall facing the hallway 3, the left wall of the storage chamber 2 and the like as long as the user which passes through the gate 100 of the storage chamber 2 can be imaged. In addition, although the imaging device 400 is controlled by the terminal device 300 via a communication line in the above embodiment, operation of the imaging device 400 may be controlled by a control unit which is contained in the imaging device 400 and includes a CPU, a ROM, a RAM and so on.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A detection device comprising:

a magnetic field generating unit that generates a magnetic field;

a sensing unit that detects a change in the magnetic field by a magnetic substance excited by the generated magnetic field and that outputs a signal in response to the detected change in the magnetic field;

an amplifying unit that amplifies the signal output from the sensing unit so as to output a waveform signal indicating a transient response waveform;

a first calculating unit that calculates and outputs a first correlation coefficient between the transient response waveform and a first reference waveform indicating a transient response waveform which is preliminarily stored;

a second calculating unit that calculates and outputs a second correlation coefficient between the transient response waveform and a second reference waveform indicating a transient response waveform which is preliminarily stored;

a third calculating unit that calculates a value based on the first correlation coefficient and the second correlation coefficient; and a detecting unit that outputs a detection signal indicating that the magnetic substance is detected when the value calculated by the third calculating unit satisfies a predetermined condition.

2. The detection device according to claim 1, wherein the third calculating unit calculates an average value of the first correlation coefficient and the second correlation coefficient, and wherein the detecting unit outputs a detection signal indicating that the magnetic substance is detected when the average value calculated by the third calculating unit is equal to or more than a threshold.

3. The detection device according to claim 1, wherein the third calculating unit calculates a difference between the first correlation coefficient and the second correlation coefficient, and wherein the detecting unit outputs a detection signal indicating that the magnetic substance is detected when the difference calculated by the third calculating unit is equal to or less than a threshold.

4. The detection device according to claim 1, wherein the first reference waveform is a reference waveform indicating a waveform signal corresponding to a first phase of the magnetic field, and wherein the second reference waveform is a reference waveform indicating a waveform signal corresponding to a second phase of the magnetic field, the second phase being different from the first phase.

5. The detection device according to claim 1, wherein the first reference waveform is a transient response waveform indicated by a waveform signal when the magnetic substance is placed at a first position with respect to the magnetic field generating unit, and wherein the second reference waveform is a transient response waveform indicated by a waveform signal when the magnetic substance is placed at a second position with respect to the magnetic field generating unit, the second position being different from the first position.

6. The detection device according to claim 1, wherein the first reference waveform is a transient response waveform indicated by a waveform signal when a lengthwise direction of the magnetic substance coincides with a first direction of the magnetic field generating unit, and wherein the second reference waveform is a transient response waveform indicated by a waveform signal when the lengthwise direction of the magnetic substance coincides with a second direction of the magnetic field generating unit, the second direction being different from the first direction.

7. A processing system comprising:

a detection device comprising:

a magnetic field generating unit that generates a magnetic field;

a sensing unit that detects a change in the magnetic field by a magnetic substance excited by the generated magnetic field and that outputs a signal in response to the detected change in the magnetic field;

an amplifying unit that amplifies the signal output from the sensing unit so as to output a waveform signal indicating a transient response waveform;

a first calculating unit that calculates and outputs a first correlation coefficient between the transient response waveform and a first reference waveform indicating a transient response waveform which is preliminarily stored;

a second calculating unit that calculates and outputs a second correlation coefficient between the transient response waveform and a second reference waveform indicating a transient response waveform which is preliminarily stored;

a third calculating unit that calculates a value based on the first correlation coefficient and the second correlation coefficient; and a detecting unit that outputs a detection signal indicating that the magnetic substance is detected when the value calculated by the third calculating unit satisfies a predetermined condition; and an operating unit that performs a predetermined operation based on a detection signal output from the detection device.

8. The processing system according to claim 7, wherein the third calculating unit calculates an average value of the first correlation coefficient and the second correlation coefficient, and wherein the detecting unit outputs a detection signal indicating that the magnetic substance is detected when the average value calculated by the third calculating unit is equal to or more than a threshold.

9. The processing system according to claim 7, wherein the third calculating unit calculates a difference between the first correlation coefficient and the second correlation coefficient, and wherein the detecting unit outputs a detection signal indicating that the magnetic substance is detected when the difference calculated by the third calculating unit is equal to or less than a threshold.

10. The processing system according to claim 7, wherein the first reference waveform is a reference waveform indicating a waveform signal corresponding to a first phase of the magnetic field, and wherein the second reference waveform is a reference waveform indicating a waveform signal corresponding to a second phase of the magnetic field, the second phase being different from the first phase.

11. The processing system according to claim 7, wherein the first reference waveform is a transient response waveform indicated by a waveform signal when the magnetic substance is placed at a first position with respect to the magnetic field generating unit, and wherein the second reference waveform is a transient response waveform indicated by a waveform signal when the magnetic substance is placed at a second position with respect to the magnetic field generating unit, the second position being different from the first position.

12. The processing system according to claim 7, wherein the first reference waveform is a transient response waveform indicated by a waveform signal when a lengthwise direction of the magnetic substance coincides with a first direction of the magnetic field generating unit, and wherein the second reference waveform is a transient response waveform indicated by a waveform signal when the lengthwise direction of the magnetic substance coincides with a second direction of the magnetic field generating unit, the second direction being different from the first direction.

* * * * *